US012089292B2

(12) United States Patent
Zhang et al.

(10) Patent No.: US 12,089,292 B2
(45) Date of Patent: Sep. 10, 2024

(54) TRACKING NETWORK TRAFFIC OF LOCAL AREA NETWORK (LAN) SUBNETS IN A WIRELESS WIDE AREA NETWORK (WWAN)

(71) Applicant: QUALCOMM Incorporated, San Diego, CA (US)

(72) Inventors: Juan Zhang, San Diego, CA (US); Ajith Tom Payyappilly, San Diego, CA (US); Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 248 days.

(21) Appl. No.: 17/362,737

(22) Filed: Jun. 29, 2021

(65) Prior Publication Data

US 2022/0417737 A1 Dec. 29, 2022

(51) Int. Cl.
*H04W 8/28* (2009.01)
*H04W 76/12* (2018.01)
(Continued)

(52) U.S. Cl.
CPC ............. *H04W 8/28* (2013.01); *H04W 76/12* (2018.02); *H04L 2101/659* (2022.05); *H04W 84/12* (2013.01)

(58) Field of Classification Search
CPC ....... H04W 8/28; H04W 76/12; H04W 84/12; H04W 40/24; H04L 2101/659;
(Continued)

(56) References Cited

U.S. PATENT DOCUMENTS 8,565,139 B2 * 10/2013 Kale ..................... H04L 12/189
370/312
10,412,004 B2 * 9/2019 Ong ....................... H04L 69/22
(Continued)

FOREIGN PATENT DOCUMENTS

WO WO-2021070086 A1 4/2021

OTHER PUBLICATIONS

International Search Report and Written Opinion—PCT/US2022/073068—ISA/EPO—Nov. 16, 2022.

*Primary Examiner* — Kibrom T Hailu
(74) *Attorney, Agent, or Firm* — Holland & Hart LLP/Qualcomm

(57) ABSTRACT

This disclosure provides systems, methods, and apparatus, including computer programs encoded on computer-readable media, for tracking network traffic for local area network (LAN) subnets in a wireless wide area network (WWAN). In some implementations, a UE of the WWAN may assign a unique public IP address to each router of the LAN. The UE may transmit network traffic received from the LAN to the WWAN. The network traffic originating from any router of the LAN may be associated with the unique public IP address that was assigned to that router. The WWAN may use the unique public IP addresses to generate network traffic information that may indicate amounts of network traffic flowing from each router of the LAN. The WWAN, for example, may use the network traffic information to determine billing information for any router in the LAN.

30 Claims, 12 Drawing Sheets

(51) Int. Cl.
*H04L 101/659* (2022.01)
*H04W 84/12* (2009.01)

(58) Field of Classification Search
CPC ............ H04L 61/5092; H04L 61/2514; H04L 2101/604; H04L 2101/686; H04L 45/74; H04L 61/5007; H04L 12/66
See application file for complete search history.

(56) References Cited

U.S. PATENT DOCUMENTS

| | | |
|---|---|---|
| 2013/0223230 A1 | 8/2013 | Swaminathan et al. |
| 2016/0036772 A1 | 2/2016 | Pratapa et al. |
| 2018/0109458 A1* | 4/2018 | Chow ................. H04L 12/2854 |
| 2019/0020583 A1* | 1/2019 | Bashandy ............... H04L 45/74 |
| 2019/0260402 A1* | 8/2019 | Chuang ................ H04B 1/0475 |
| 2020/0112512 A1* | 4/2020 | Cioffi .................... H04L 47/762 |
| 2020/0359439 A1* | 11/2020 | Qiao ...................... H04W 76/12 |
| 2021/0400537 A1* | 12/2021 | Zhang ..................... H04L 47/28 |
| 2022/0046484 A1* | 2/2022 | Örtenblad ............... H04L 67/63 |
| 2022/0286895 A1* | 9/2022 | Lee ................... H04W 28/0257 |

\* cited by examiner

TRACKING NETWORK TRAFFIC OF LOCAL AREA NETWORK (LAN) SUBNETS IN A WIRELESS WIDE AREA NETWORK (WWAN)

TECHNICAL FIELD

Aspects of the present disclosure relate generally to wireless communication and to techniques for tracking network traffic of local area network (LAN) subnetworks in a wireless wide area network (WWAN).

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the $3^{rd}$ generation (3G) and $4^{th}$ generation (4G, including long term evolution (LTE)) technologies to a next generation new radio (NR) technology, which may be referred to as $5^{th}$ Generation (5G) or 5G NR. For example, NR is designed to provide a lower latency, a higher bandwidth or a higher throughput, and a higher reliability than 3G or LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave (mmW)) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

Wireless communication networks may support some combination of 2G, 3G, LTE, and 5G NR technologies. A UE may communicate with the wireless communication network using one or more of the 2G, 3G, LTE, and 5G NR technologies. For example, the UE may use 5G NR for some applications, such as data transmissions, and may use LTE for other applications, such as voice transmissions. A UE also may have access to wireless local area networks (WLANs) in the wireless communication network.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for communicating performed by a first node. The method may include assigning a first public internet protocol (IP) address to a first router of a local area network (LAN) and a second public IP address to a second router of the LAN. The method also may include transmitting first network traffic associated with the first public IP address over a wireless wide area network (WWAN) and second network traffic associated with the second public IP address over the WWAN.

In some aspects, the method may include establishing a first protocol data unit (PDU) session for the first public IP address and a second PDU session for the second public IP address, where the first network traffic may be exchanged over the WWAN via the first PDU session and the second network traffic may be exchanged over the WWAN via the second PDU session.

In some aspects, the method may include establishing a first network slice of the WWAN for the first public IP address and a second network slice of the WWAN for the second public IP address, where the first network traffic may be exchanged over the WWAN via the first network slice and the second network traffic may be exchanged over the WWAN via the second network slice.

Another innovative aspect of the subject matter described in this disclosure can be implemented in a method for communicating performed by a first node. The method may include receiving first network traffic from a first IP address associated with a first router of a LAN and second network traffic from a second IP address associated with a second router of the LAN. The method also may include transmitting first encapsulated packets via a first tunnel instance of a tunnel and second encapsulated packets via the second tunnel instance of the tunnel over a WWAN to a second node. An IP address of the first node may be a source IP address of the first encapsulated packets and the second encapsulated packets.

Another innovative aspect of the subject matter described in this disclosure can be implemented in an apparatus of a first node for wireless communication. The apparatus may include one or more processors configured to assign a first public IP address to a first router of a LAN and a second public IP address to a second router of the LAN. The apparatus also may include one or more interfaces configured to transmit first network traffic associated with the first public IP address over a WWAN and second network traffic associated with the second public IP address over the WWAN.

Another innovative aspect of the subject matter described in this disclosure can be implemented in an apparatus of a first node for wireless communication. The apparatus may include one or more processors configured to implement the wireless communication. The apparatus also may include one or more interfaces configured to receive first network traffic from a first IP address associated with a first router of a LAN and second network traffic from a second IP address associated with a second router of the LAN. The one or more interfaces also may be configured to transmit first encapsulated packets via a first tunnel instance of a tunnel and second encapsulated packets via a second tunnel instance of the tunnel over a WWAN to a second node, where an IP address of the first node is a source IP address of the first encapsulated packets and the second encapsulated packets.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
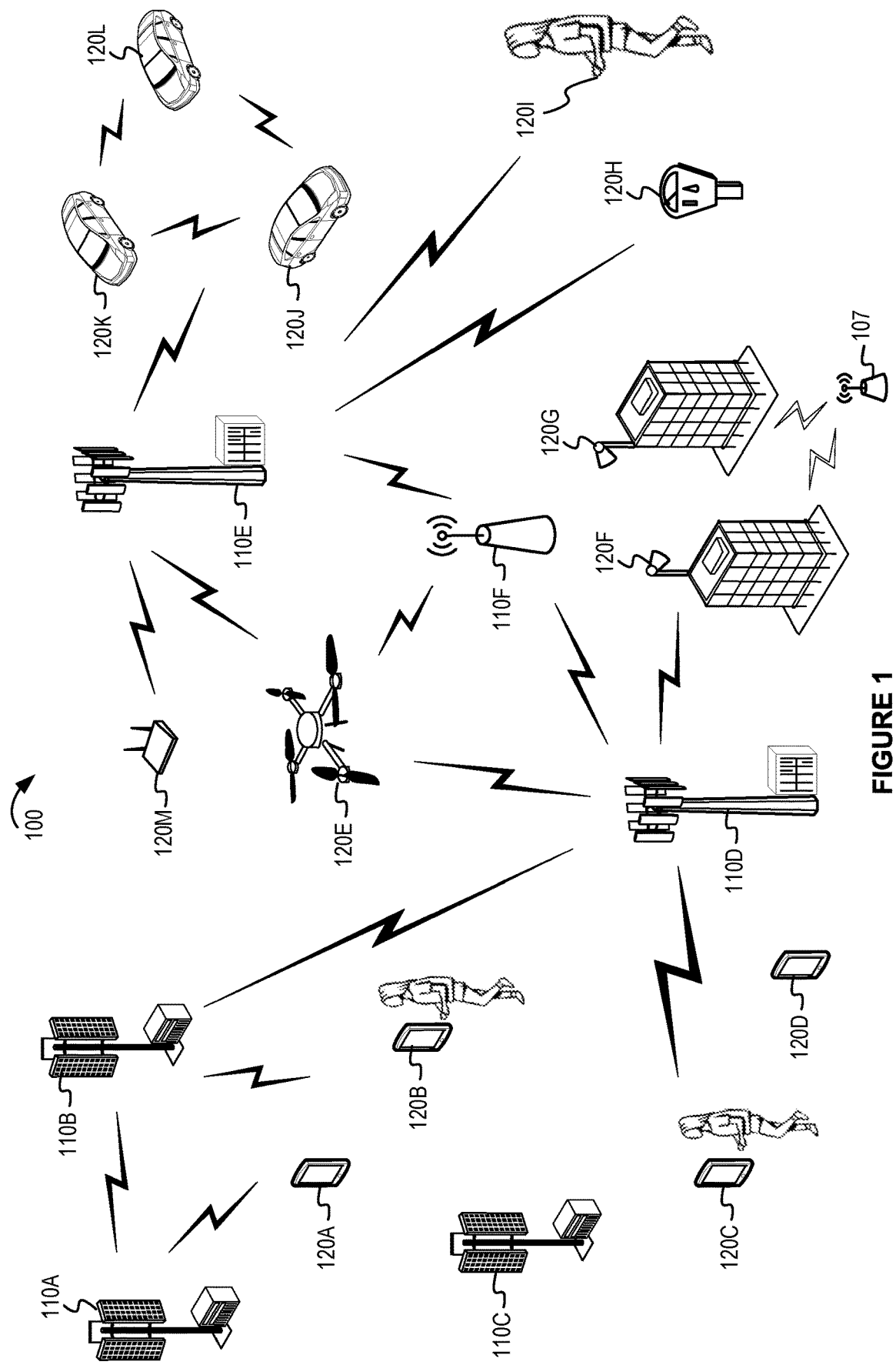
FIG. 1 is a system diagram of an example wireless communication network.

The following description is directed to certain implementations for the purposes of describing the innovative aspects of this disclosure. However, a person having ordinary skill in the art will readily recognize that the teachings herein can be applied in a multitude of different ways. The examples in this disclosure are based on wireless network communications in wireless wide area networks (WWANs). However, the described implementations may be implemented in any device, system or network that is capable of transmitting and receiving radio frequency signals according to any of the wireless communication standards, including any of the Institute of Electrical and Electronics Engineers (IEEE) 802.11 standards, the Bluetooth® standard, code division multiple access (CDMA), time division multiple access (TDMA), frequency division multiple access (FDMA), orthogonal FDMA (OFDMA), single-carrier FDMA (SC-FDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), $5^{th}$ Generation (5G) or new radio (NR), Advanced Mobile Phone Service (AMPS), or other known signals that are used to communicate within a wireless, cellular or internet of things (IoT) network, such as a system utilizing 3G, 4G or 5G, or further implementations thereof, technology.

A wireless communication network (which also may be referred to as a wireless WAN or WWAN) may include base stations (BSs) that implement a 5G NR radio access technology (RAT) of a 5G NR network and BSs that implement an LTE RAT of an LTE network. The RATs of a WWAN also may be referred to as WWAN RATs. A user equipment (UE) of the wireless communication network may use the 5G NR RAT or the LTE RAT depending on which wireless coverage is available to the UE and which wireless coverage provides the best quality service.

A user equipment (UE) of a WWAN (such as a 5G NR network) may provide network connectivity to a local area network (LAN). In the LAN, host devices (such as personal computers) may be wirelessly connected to routers of the LAN. The host devices and routers of the LAN may have private internet protocol (IP) addresses that are known to the UE but not otherwise known outside the LAN. In contrast, the UE may have a globally routable public IP address. Hence, network traffic flowing to the WWAN from the LAN may be associated with the public IP address of the UE and not any of the private IP addresses of the LAN. For network traffic flowing to the LAN from the WWAN, the UE may utilize network address translation (NAT) to deliver the network traffic to appropriate private IP addresses of the LAN.

Various aspects of this disclosure relate generally to techniques for transmitting network traffic between a LAN and WWAN. Additionally, some aspects relate to techniques for tracking network traffic flowing between the WWAN and specific devices of the LAN. The UE of the WWAN may assign a unique public IP address to each router of the LAN. The UE may transmit network traffic from the LAN to the WWAN. The network traffic originating from any router of the LAN may be associated with the unique public IP address that was assigned to that router. The WWAN may use the unique public IP addresses to generate network traffic information that may indicate amounts of network traffic flowing from each router of the LAN. The WWAN, for example, may use the network traffic information to determine billing information for any router in the LAN.

In some implementations, the UE may transmit network traffic from each router of the LAN to the WWAN over a different protocol data unit (PDU) session. For example, the UE may establish a first PDU session for a first router of the LAN. The first PDU session may be associated with a first public IP address that was assigned to the first router by the UE. Similarly, the UE may transmit network traffic from a second router of the LAN over a second PDU session, where the second PDU session is associated with a second public IP address that was assigned to the second router by the UE. The WWAN may track network traffic for each PDU session to determine network traffic information related to the first and second routers. In some implementations, the UE may be configured with a first pseudo data network name (DNN) and a second pseudo DNN. The first router may use the first pseudo DNN to access the WWAN, and the second router may use the second pseudo DNN to access the WWAN.

In some implementations, the UE may transmit network traffic for each router of the LAN to the WWAN over different network slices. For example, the UE may establish a first network slice for the first router of the LAN. The first network slice may be associated with a first public IP address that was assigned to the first router by the UE. Similarly, the UE may transmit network traffic from a second router of the LAN over a second network slice, where the second PDU session is associated with a second public IP address that was assigned to the second router by the UE. The WWAN may track network traffic for each network slice to determine or identify network traffic information related to the first and second routers.

In some implementations, each public IP address for each router of the LAN may be an IPv6 address. Each IPv6 address may include an IPv6 prefix and IPv6 interface identifier (IID). The UE may receive a range of unique IPv6 prefixes from the WWAN. To assign an IPv6 address to a router of the LAN, the UE may select an IPv6 prefix from the range of IPv6 prefixes received from the WWAN and assign the selected IPv6 prefix to a router. The router may form its IPv6 address by determining an IPv6 IID and combining it with the IPv6 prefix. The WWAN also may track network traffic from each router of the LAN based on the IPv6 address of each router.

In some implementations, the UE may receive a single IPv6 prefix from the WWAN for use in assigning a different unique IPv6 address to each router of the LAN. The UE may provide the IPv6 prefix and a portion of an IPv6 IID to each router of the LAN. In some implementations, each IPv6 IID portion may be different for each router of the LAN. Each router may select, identify or determine the remainder of the IPv6 IID to form its own unique IPv6 address. The WWAN also may track network traffic from each router of the LAN based on the IPv6 address of each router.

In some implementations, each router of the LAN may have a different private IP address that is not globally routable by the WWAN. The UE may generate a different tunnel for each router using any suitable tunneling protocol (such as General Routing Encapsulation (GRE), IP-to-IP, IP Security (IPSec), or other such approaches). The UE may receive network traffic from each router and encapsulate the network traffic from each router into a different tunnel. The UE may transmit the encapsulated network traffic over the WWAN to a tunnel server. The tunnel server may decapsulate the network traffic and transmit the decapsulated network traffic to one or more destinations, such as one or more webservers on a remote data network. The WWAN also may track network traffic for each router of the LAN based on an association between the routers and the tunnels.

Particular implementations of the subject matter described in this disclosure can be implemented to realize one or more of the following potential advantages. A UE may enable a WWAN to identify each router of a LAN and track network traffic of each router in the LAN, such as by assigning a unique public IP address to each router, using a unique PDU session for each router, using a unique network slice for each router, etc. When the WWAN can identify routers in a LAN, the WWAN may tailor specific services for each router of the LAN. For example, the WWAN may provide a low-latency service to a first router of the LAN while providing a high data usage service to a second router of the LAN. While the WWAN may identify routers in the LAN, user identities may remain hidden from the WWAN. For example, user identities may be known within a subnet of a router but not outside that subnet. Additionally, a WWAN operator may be able to accurately charge fees based on usage of each router of the LAN. As a result, WWAN providers may achieve better overall network performance using fewer resources, having better security for users and charging lower rates.

FIG. 1 is a system diagram of an example wireless communication network 100. The wireless communication network 100 may be an LTE network or a 5G NR network, or a combination thereof. The wireless communication network 100 also may be referred to as a wide area network (WAN) or a wireless wide area network (WWAN). The wireless communication network 100 includes a number of base stations (BSs) 110 (individually labeled as 110A, 110B, 110C, 110D, 110E, and 110F) and other network entities. ABS 110 may be a station that communicates with UEs 120 and also may be referred to as an evolved node B (eNB), a next generation eNB (gNB), an access point, and the like. In some implementations, a BS 110 may represent an eNB of an LTE network or a gNB of a 5G NR network, or a combination thereof. Each BS 110 may provide communication coverage for a particular geographic area. In 3GPP, the term "cell" can refer to this particular geographic coverage area of a BS 110 or a BS subsystem serving the coverage area, depending on the context in which the term is used.

ABS 110 may provide communication coverage for a macro cell or a small cell, such as a pico cell or a femto cell, or other types of cells. A macro cell generally covers a relatively large geographic area (such as several kilometers in radius) and may allow unrestricted access by UEs with service subscriptions with the network provider. A pico cell generally covers a relatively smaller geographic area and may allow unrestricted access by UEs with service subscriptions with the network provider. A femto cell generally covers a relatively small geographic area (such as a home) and, in addition to unrestricted access, also may provide restricted access by UEs having an association with the femto cell (such as UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 110D and 110E may be regular macro BSs, while the BSs 110A-110C may be macro BSs enabled with three dimensions (3D), full dimensions (FD), or massive MIMO. The BSs 110A-110C may take advantage of their higher dimension MIMO capabilities to exploit 3D beamforming in both elevation and azimuth beamforming to increase coverage and capacity. The BS 110F may be a small cell BS which may be a home node or portable access point. ABS 110 may support one or multiple (such as two, three, four, and the like) cells. In some implementations, the BS 110 may be an example of a node or a network entity of the WWAN 100.

The wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 120 are dispersed throughout the wireless communication network 100, and each UE 120 may be stationary or mobile. A UE 120 also may be referred to as a terminal, a mobile station, a wireless device, a subscriber unit, a station, or the like. In some implementations, the UE 120 may be an example of a node or a network entity of the WWAN 100. A UE 120 may be a mobile phone, a personal digital assistant (PDA), a wireless modem, a wireless communication device, a handheld device, a wearable device, a tablet computer, a laptop computer, a cordless phone, a wireless local loop (WLL) station, a smart appliance, a drone, a video camera, a sensor, or the like. In one aspect, a UE 120 may be a device that includes a Universal Integrated Circuit Card (UICC). In another aspect, a UE may be a device that does not include a UICC. In some aspects, the UEs 120 that do not include UICCs also may be referred to as IoT devices or internet of everything (IoE) devices. The UEs 120A-120D are examples of mobile smart phone-type devices that may access the wireless communication network 100. A UE 120 also may be a machine specifically configured for connected communication, including machine type communication (MTC), enhanced MTC (eMTC), narrowband IoT (NB-IoT), and the like. The UEs 120E-120L are examples of various machines configured for communication that access the wireless communication network 100. A UE 120 may be able to communicate with any type of the BSs, whether macro BS, small cell, or the like. In FIG. 1, a lightning bolt is representative of a communication link that indicates wireless transmissions between a UE 120 and a serving BS 110, which is a BS designated to serve the UE 120 on the downlink and uplink, or desired transmission between BSs, and backhaul transmissions between BSs.

In operation, the BSs 110A-110C may serve the UEs 120A and 120B using 3D beamforming and coordinated spatial techniques, such as coordinated multipoint (CoMP) or multi-connectivity. The macro BS 110D may perform backhaul communications with the BSs 110A-110C, as well as the BS 110F (which may be a small cell BS). The macro BS 110D also may transmit multicast services which are subscribed to and received by the UEs 120C and 120D. Such multicast services may include mobile television or stream video, or may include other services for providing community information, such as weather emergencies or alerts, such as Amber alerts or gray alerts.

The BSs 110 also may communicate with a core network. The core network may provide user authentication, access authorization, tracking, Internet Protocol (IP) connectivity, and other access, routing, or mobility functions. At least some of the BSs 110 (such as a gNB or an access node controller (ANC)) may interface with the core network through backhaul links (such as NG-C and NG-U) and may perform radio configuration and scheduling for communication with the UEs 120. In various examples, the BSs 110 may communicate, either directly or indirectly (such as through core network), with each other over backhaul links, which may be wired or wireless communication links.

The wireless communication network 100 also may support mission critical communications with ultra-reliable and redundant links for mission critical devices, such as the UE 120E, which may be a drone. Redundant communication links with the UE 120E may include links from the macro BSs 110D and 110E, as well as links from the small cell BS 110F. Other machine type devices, such as the UE 120F and UE 120G (such as video cameras or smart lighting), the UE 120H (such as a smart meter), and UE 120I (such as a wearable device) may communicate through the wireless communication network 100 either directly with the BSs, such as the small cell BS 110F, and the macro BS 110E, or in multi-hop configurations by communicating with another user device which relays its information to the wireless communication network 100. For example, the UE 120H may communicate smart meter information to the UE 120I (such as a wearable device or mobile phone), which may report to the wireless communication network 100 through the small cell BS 110F. The wireless communication network 100 also may provide additional network efficiency through dynamic, low-latency TDD/FDD communications, such as in vehicle-to-vehicle (V2V) communications, as shown by UEs 120J-120L. The wireless communication network 100 also may provide connectivity to devices on a LAN. For example, the UE 120M, which may be an outdoor modem, may connect to one or more routers in the LAN. The UE 120M may transmit network traffic from the routers of the LAN through the wireless communication network 100.

The wireless communication network 100 may include one or more access points (APs) 107 that are part of one or more wireless local area networks (WLANs). The APs 107 (which also may be referred to as WLAN APs) may provide short-range wireless connectivity to the UEs 120 of the wireless communication network 100.

In some implementations, the wireless communication network 100 may utilize OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW also may be partitioned into subbands. In other instances, the subcarrier spacing or the duration of TTIs may be scalable.

The BSs 110 may assign or schedule transmission resources (such as in the form of time-frequency resource blocks (RB)) for downlink (DL) and uplink (UL) transmissions in the wireless communication network 100. DL refers to the transmission direction from a BS 110 to a UE 120, whereas UL refers to the transmission direction from a UE 120 to a BS 110. The communication can be in the form of radio frames. A radio frame may be divided into a plurality of subframes or slots. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (such as the DL subframes) in a radio frame may be used for DL transmissions, and another subset of the subframes (such as the UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 110 and the UEs 120. For example, a reference signal can have a particular pilot pattern or structure, where pilot tones may span across an operational BW or frequency band, each positioned at a pre-defined time and a pre-defined frequency. For example, a BS 110 may transmit cell-specific reference signals (CRSs) or channel state information reference signals (CSI-RSs) to enable a UE 120 to estimate a DL channel. Similarly, a UE 120 may transmit sounding reference signals (SRSs) to enable a BS 110 to estimate a UL channel. Control information may include resource assignments and protocol controls. Data may include protocol data and operational data. In some aspects, the BSs 110 and the UEs 120 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the wireless communication network 100 may be an NR network deployed over a licensed spectrum or an NR network deployed over an unlicensed spectrum (such as NR-U and NR-U lite networks). The BSs 110 can transmit synchronization signals, including a primary synchronization signal (PSS) and a secondary synchronization signal (SSS), in the wireless communication network 100 to facilitate synchronization. The BSs 110 can broadcast system information associated with the wireless communication network 100 (such as a master information block (MIB), remaining system information (RMSI), and other system information (OSI)) to facilitate initial network access. In some instances, the BSs 110 may broadcast one or more of the PSS, the SSS, and the MIB in the form of synchronization signal block (SSBs) over a physical broadcast channel (PBCH) and may broadcast one or more of the RMSI and the OSI over a physical downlink shared channel (PDSCH).

In some aspects, a UE 120 attempting to access the wireless communication network 100 may perform an initial cell search by detecting a PSS included in an SSB from a BS 110. The PSS may enable synchronization of period timing and may indicate a physical layer identity value. The UE 120 may receive an SSS included in an SSB from the BS 110. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 120 may receive an MIB. The MIB may include system information for initial network access and scheduling information for at least one of an RMSI and OSI. After decoding the MIB, the UE 120 may receive at least one of an RMSI and OSI. The RMSI and OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, and SRS.

After obtaining one or more of the MIB, the RMSI and the OSI, the UE 120 can perform a random access procedure to establish a connection with the BS 110. In some examples, the random access procedure may be a four-step random access procedure. For example, the UE 120 may transmit a physical random access channel (PRACH), such as a PRACH preamble, and the BS 110 may respond with a random access response (RAR). The RAR may include one or more of a detected random access preamble identifier (ID) corresponding to the PRACH preamble, timing advance (TA) information, a UL grant, a temporary cell-radio network temporary identifier (C-RNTI), and a backoff indicator. Upon receiving the RAR, the UE 120 may transmit a connection request to the BS 110 and the BS 110 may respond with a connection response. The connection response may indicate a contention resolution. In some examples, the PRACH, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 120 may transmit a PRACH (including a PRACH preamble) and a connection request in a single transmission and the BS 110 may respond by transmitting a RAR and a connection response in a single transmission.

After establishing a connection, the UE 120 and the BS 110 can enter a normal operation stage, where operational data may be exchanged. For example, the BS 110 may schedule the UE 120 for UL and DL communications. The BS 110 may transmit UL and DL scheduling grants to the UE 120 via a PDCCH. The BS 110 may transmit a DL communication signal to the UE 120 via a PDSCH according to a DL scheduling grant. The UE 120 may transmit a UL communication signal to the BS 110 via a PUSCH or PUCCH according to a UL scheduling grant.

In some aspects, the wireless communication network 100 may operate over a system BW or a component carrier BW. The wireless communication network 100 may partition the system BW into multiple bandwidth parts (BWPs). A BWP may be a certain portion of the system BW. For example, if the system BW is 100 MHz, the BWPs may each be 20 MHz or less. A BS 110 may dynamically assign a UE 120 to operate over a certain BWP. The assigned BWP may be referred to as the active BWP. The UE 120 may monitor the active BWP for signaling information from the BS 110. The BS 110 may schedule the UE 120 for UL or DL communications in the active BWP. In some implementations, the BS 110 may configure UEs 120 with narrowband operation capabilities (such as with transmission and reception limited to a BW of 20 MHz or less) to perform BWP hopping for channel monitoring and communications.

In some aspects, a BS 110 may assign a pair of BWPs within the component carrier to a UE 120 for UL and DL communications. For example, the BWP pair may include one BWP for UL communications and one BWP for DL communications. The BS 110 may additionally configure the UE 120 with one or more CORESETs in a BWP. A CORESET may include a set of frequency resources spanning a number of symbols in time. The BS 110 may configure the UE 120 with one or more search spaces for PDCCH monitoring based on the CORESETS. The UE 120 may perform blind decoding in the search spaces to search for DL control information (such as UL or DL scheduling grants) from the BS 110. For example, the BS 110 may configure the UE 120 with one or more of the BWPs, the CORESETS, and the PDCCH search spaces via RRC configurations.

In some aspects, the wireless communication network 100 may operate over a shared frequency band or an unlicensed frequency band, for example, at about 3.5 gigahertz (GHz), sub-6 GHz or higher frequencies in the mmWave band. The wireless communication network 100 may partition a frequency band into multiple channels, for example, each occupying about 20 MHz. The BSs 110 and the UEs 120 may be operated by multiple network operating entities sharing resources in the shared communication medium and may employ a LBT procedure to acquire channel occupancy time (COT) in the share medium for communications. A COT may be non-continuous in time and may refer to an amount of time a wireless node can send frames when it has won contention for the wireless medium. Each COT may include a plurality of transmission slots. A COT also may be referred to as a transmission opportunity (TXOP). The BS 110 or the UE 120 may perform an LBT in the frequency band prior to transmitting in the frequency band. The LBT can be based on energy detection or signal detection. For energy detection, the BS 110 or the UE 120 may determine that the channel is busy or occupied when a signal energy measured from the channel is greater than a certain signal energy threshold. For signal detection, the BS 110 or the UE 120 may determine that the channel is busy or occupied when a certain reservation signal (such as a preamble signal sequence) is detected in the channel.

Figure 2:
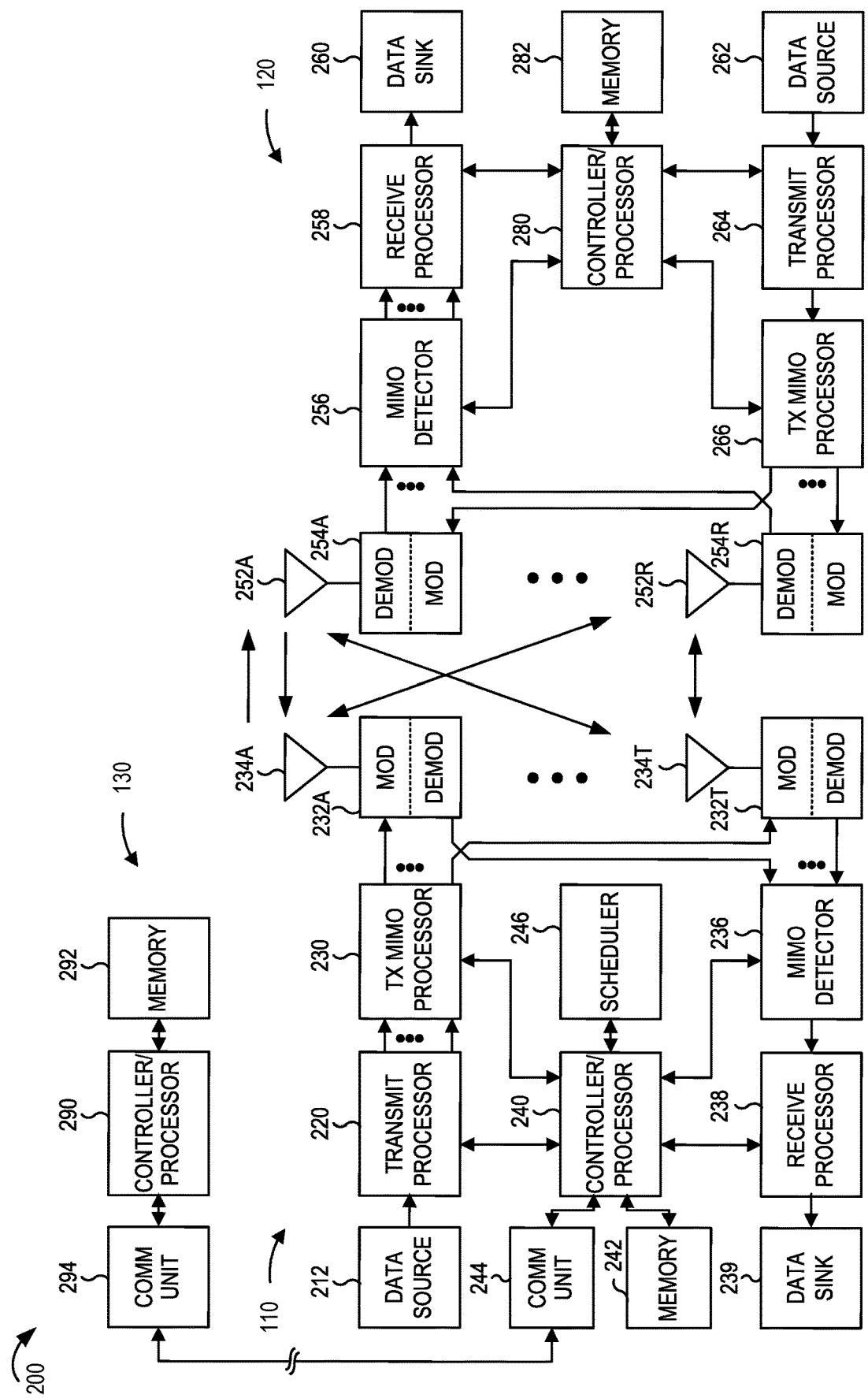
FIG. 2 is a block diagram conceptually illustrating an example of a base station (BS) 110 in communication with a UE.

FIG. 2 is a block diagram conceptually illustrating an example 200 of a BS 110 in communication with a UE 120. In some aspects, BS 110 and UE 120 may respectively be one of the BSs and one of the UEs in wireless communication network 100 of FIG. 1. BS 110 may be equipped with T antennas 234A through 234T, and UE 120 may be equipped with R antennas 252A through 252R, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. The transmit processor 220 also may process system information (for example, for semi-static resource partitioning information (SRPI), etc.) and control information (for example, CQI requests, grants, upper layer signaling, etc.) and provide overhead symbols and control symbols. The transmit processor 220 also may generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators-demodulators (MODs-DEMODs) 232A through 232T (which also may be referred to as mods/demods or modems). Each MOD-DEMOD 232 may process a respective output symbol stream (for example, for OFDM, etc.) to obtain an output sample stream. Each MOD-DEMOD 232 may further process (for example, convert to analog, amplify, filter, and upconvert) the output sample stream to obtain a downlink signal. T downlink signals from MODs-DEMODs 232A through 232T may be transmitted via T antennas 234A through 234T, respectively. According to various aspects described in more detail below, the synchronization signals can be generated with location encoding to convey additional information.

At UE 120, antennas 252A through 252R may receive the downlink signals from BS 110 or other BSs and may provide received signals to modulators-demodulators (MODs-DEMODs) 254A through 254R, respectively (which also may be referred to as mods/demods or modems). Each MOD-DEMOD 254 may condition (for example, filter, amplify, downconvert, and digitize) a received signal to obtain input samples. Each MOD-DEMOD 254 may further process the input samples (for example, for OFDM, etc.) to obtain received symbols. A MIMO detector 256 may obtain received symbols from all R MODs-DEMODs 254A through 254R, perform MIMO detection on the received symbols if applicable, and provide detected symbols. A receive processor 258 may process (for example, demodulate and decode) the detected symbols, provide decoded data for UE 120 to a data sink 260, and provide decoded control information and system information to a controller or processor (controller/processor) 280. A channel processor may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at UE 120, a transmit processor 264 may receive and process data from a data source 262 and control information (for example, for reports including RSRP, RSSI, RSRQ, CQI, etc.) from controller/processor 280. Transmit processor 264 also may generate reference symbols for one or more reference signals. The symbols from transmit processor 264 may be precoded by a TX MIMO processor 266 if applicable, further processed by MODs-DEMODs 254A through 254R (for example, for DFT-s-OFDM, CP-OFDM, etc.), and transmitted to BS 110. At BS 110, the uplink signals from UE 120 and other UEs may be received by antennas 234, processed by MOD-DEMOD 232, detected by a MIMO detector 236 if applicable, and further processed by a receive processor 238 to obtain decoded data and control information sent by UE 120. Receive processor 238 may provide the decoded data to a data sink 239 and the decoded control information to a controller or processor (i.e., controller/processor) 240. The BS 110 may include communication unit 244 and may communicate to network controller 130 via communication unit 244. The network controller 130 may include communication unit 294, a controller or processor (i.e., controller/processor) 290, and memory 292.

The controller/processor 240 of BS 110, the controller/processor 280 of UE 120, or any other component(s) of FIG. 2 may perform one or more techniques associated with tracking network traffic from LAN subnetworks, as described in more detail elsewhere herein. For example, the controller/processor 240 of BS 110, the controller/processor 280 of UE 120, or any other component(s) (or combinations of components) of FIG. 2 may perform or direct operations related to tracking network traffic from LAN subnetworks, as depicted in and described with reference to FIGS. 4-10. The memories 242 and 282 may store data and program codes for BS 110 and UE 120, respectively. A scheduler 246 may schedule UEs for data transmission on the downlink, the uplink, or a combination thereof.

Figure 7:
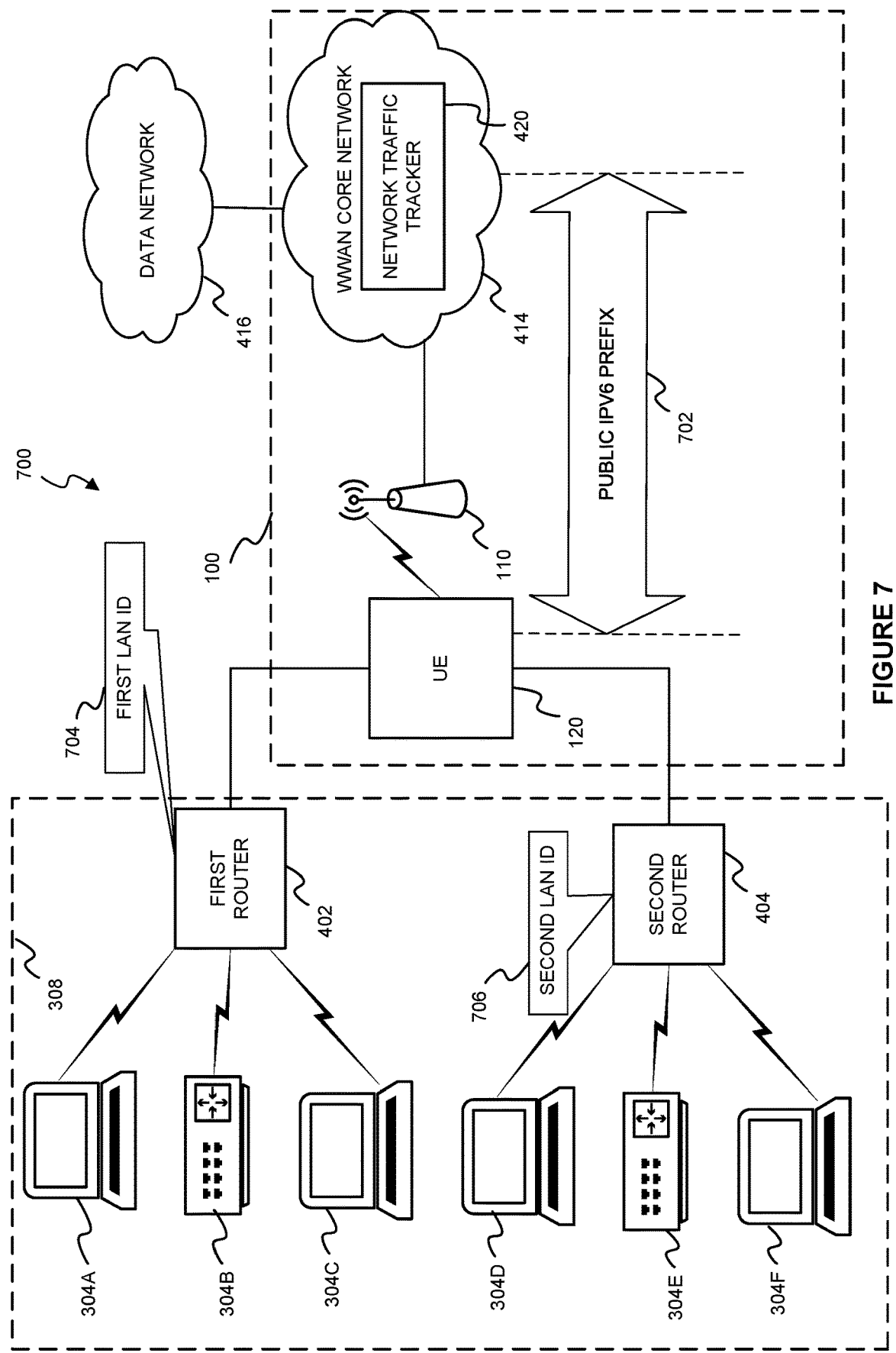
FIG. 7 is a diagram illustrating example operations for using aspects of IPv6 addressing to track network traffic of particular routers of the WLAN.
Figure 8:
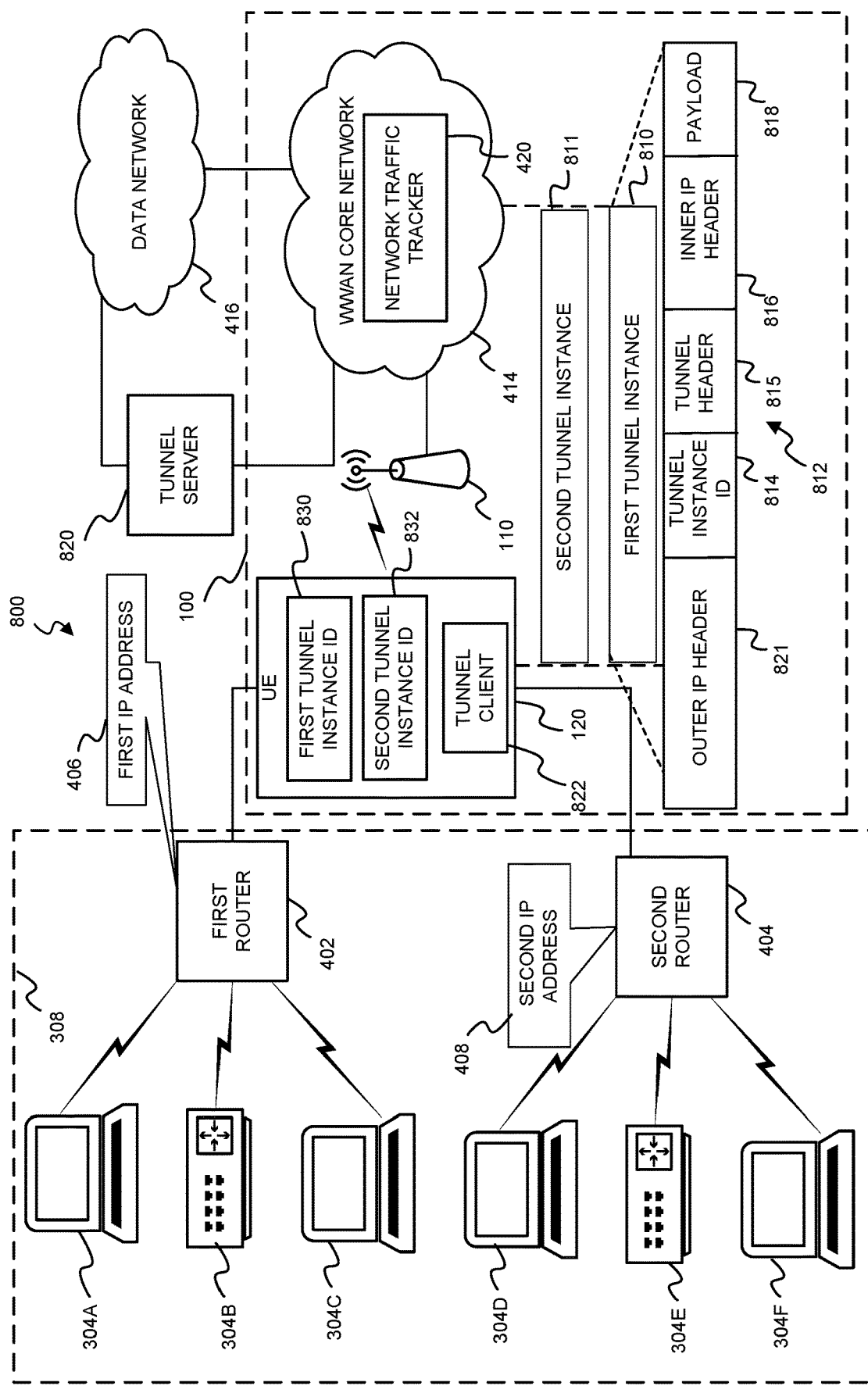
FIG. 8 is a diagram illustrating example operations for using tunneling to track network traffic of particular routers of the WLAN.
Figure 9:
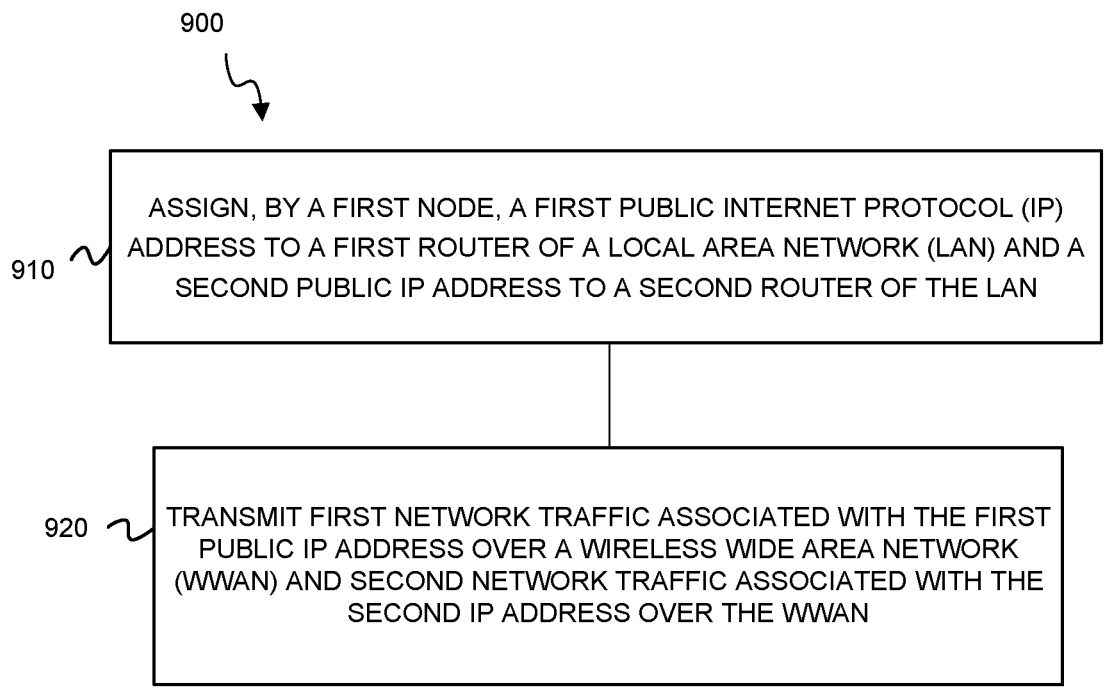
FIG. 9 depicts a process illustrating example operations performed by a node for communicating in a wireless wide area network (WWAN).
Figure 10:
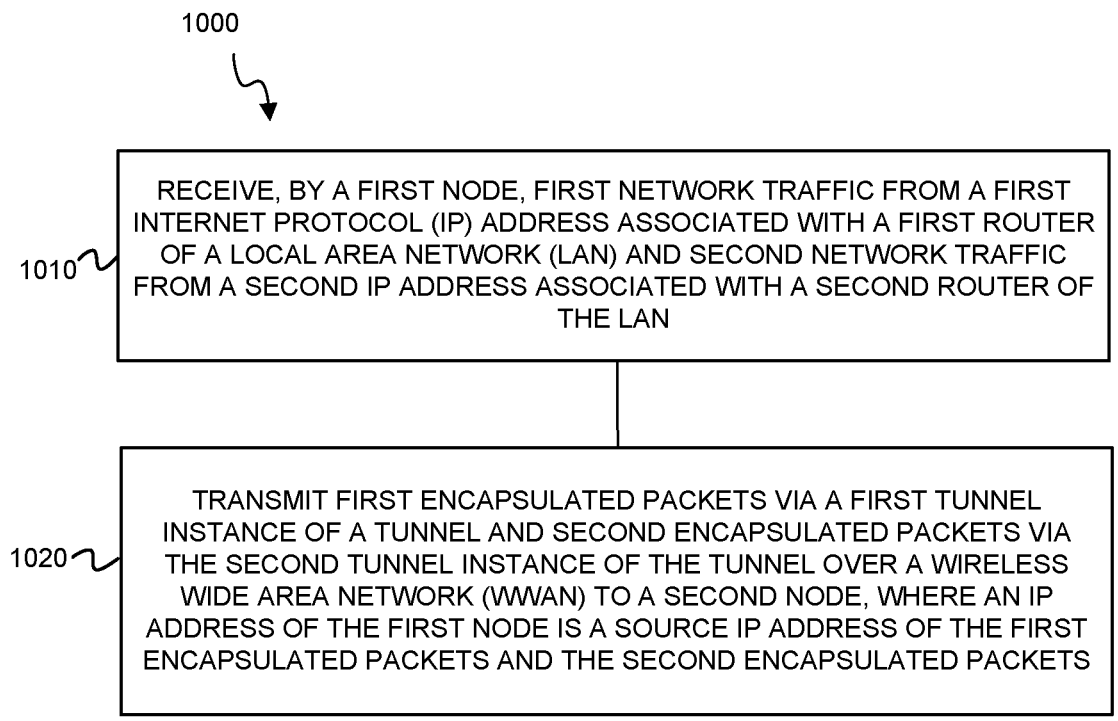
FIG. 10 depicts a process illustrating example operations performed by a node for communicating in a WWAN.

The stored program codes, when executed by the controller/processor 280 or other processors and modules at the UE 120, may cause the UE 120 to perform the process depicted by the process 900 of FIG. 9, the process 1000 of FIG. 10 or other processes as described herein, such as the processes described in FIGS. 4-8. The stored program codes, when executed by the controller/processor 240 or other processors and modules at the BS 110, may cause the BS 110 to perform one or more operations or processes described with respect to FIGS. 4-10. A scheduler 246 may schedule the UEs for data transmission on the downlink, the uplink, or a combination thereof.

In some aspects, the UE 120 may include means for performing the process 900 of FIG. 9, the process of FIG. 10 or other processes as described herein, such as the operations described in FIGS. 4-8. In some aspects, such means may include one or more components of the UE 120 described in connection with FIG. 2.

In some aspects, the BS 110 may include means for performing the process depicted by the process 900 of FIG. 9, the process 1000 of FIG. 10 or other processes as described herein, such as the processes described in FIGS. 4-8. In some aspects, such means may include one or more components of the BS 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, the TX MIMO processor 266, or another processor may be performed by or under the control of controller/processor 280.

Figure 3:
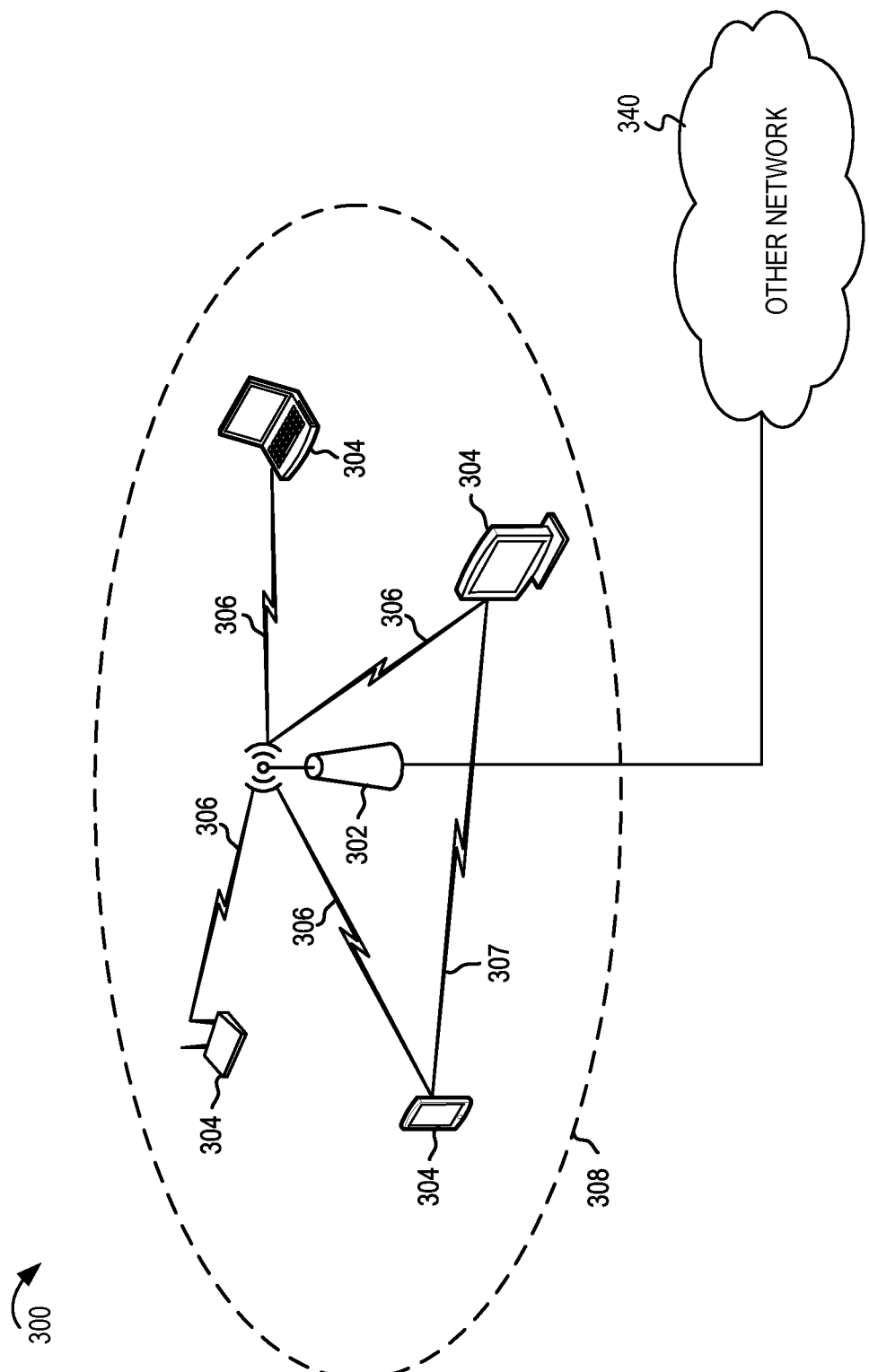
FIG. 3 shows a system diagram of an example wireless communication network.

FIG. 3 shows a system diagram of an example wireless communication network 300. According to some aspects, the wireless communication network 300 can be an example of a WLAN such as a Wi-Fi network (and will hereinafter be referred to as WLAN 300). For example, the WLAN 300 can be a network implementing at least one of the IEEE 802.11 family of standards (such as that defined by the IEEE 802.11-2016 specification or amendments thereof including, but not limited to, 802.11aa, 802.11ah, 802.11ad, 802.11aq, 802.11ay, 802.11ax, 802.11az, 802.11ba and 802.11be). The WLAN 300 may include numerous WLAN devices such as an access point (AP) 302 and multiple stations (STAs) 304 that have a wireless association with the AP 302. While only one AP 302 is shown, the WLAN 300 also can include multiple APs 302. The IEEE 802.11-2016 standard defines a STA as an addressable unit. An AP is an entity that contains at least one STA and provides access via a wireless medium (WM) for associated STAs to access a distribution service (such as another network, not shown). Thus, an AP includes a STA and a distribution system access function (DSAF). In the example of FIG. 3, the AP 302 may be connected to a gateway device (not shown) which provides connectivity to the other network 340. The DSAF of the AP 302 may provide access between the STAs 304 and another network 340. While AP 302 is described as an access point using an infrastructure mode, in some implementations, the AP 302 may be a traditional STA which is operating as an AP. For example, the AP 302 may be a STA capable of operating in a peer-to-peer mode or independent mode. In some other examples, the AP 302 may be a software AP (SoftAP) operating on a computer system.

Each of the STAs 304 also may be referred to as a mobile station (MS), a mobile device, a mobile handset, a wireless handset, an access terminal (AT), a user equipment (UE), a subscriber station (SS), or a subscriber unit, among other possibilities. The STAs 304 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 302 and an associated set of STAs 304 may be referred to as a basic service set (BSS), which is managed by the respective AP 302. FIG. 3 additionally shows an example coverage area 308 of the AP 302, which may represent a basic service area (BSA) of the WLAN 300. The BSS may be identified to users by a service set identifier (SSID), as well as to other devices by a basic service set identifier (BSSID), which may be a media access control (MAC) address of the AP 302. The AP 302 periodically broadcasts beacons including the BSSID to enable any STAs 304 within wireless range of the AP 302 to establish a respective communication link 306 (hereinafter also referred to as a "Wi-Fi link"), or to maintain a communication link 306, with the AP 302. For example, the beacons can include an identification of a primary channel used by the respective AP 302 as well as a timing synchronization function for establishing or maintaining timing synchronization with the AP. The AP 302 may provide access to external networks (such as the network 340) to various STAs 304 in the WLAN via respective communication links 306. To establish a communication link 306 with an AP 302, each of the STAs 304 is configured to perform passive or active scanning operations ("scans") on frequency channels in one or more frequency bands (for example, the 2.4 GHz, 5 GHz, 6 GHz or 60 GHz bands). To perform passive scanning, a STA 304 listens for beacons, which are transmitted by respective APs 302 at a periodic time interval referred to as the target beacon transmission time (TBTT) (measured in time units (TUs) where one TU may be equal to 1024 microseconds (μs)). To perform active scanning, a STA 304 generates and sequentially transmits probe requests on each channel to be scanned and listens for probe responses from APs 302. Each STA 304 may be configured to identify or select an AP 302 with which to associate based on the scanning information obtained through the passive or active scans, and to perform authentication and association operations to establish a communication link 306 with the selected AP 302. The AP 302 may assign an association identifier (AID) to the STA 304 at the culmination of the association operations, which the AP 302 uses to track the STA 304.

As a result of the increasing ubiquity of wireless networks, a STA 304 may have the opportunity to select one of many BSSs within range of the STA or to select among multiple APs 302 that together form an extended service set (ESS) including multiple connected BSSs. An extended network station associated with the WLAN 300 may be connected to a wired or wireless distribution system that may allow multiple APs 302 to be connected in such an ESS. As such, a STA 304 can be covered by more than one AP 302 and can associate with different APs 302 at different times for different transmissions. Additionally, after association with an AP 302, a STA 304 also may be configured to periodically scan its surroundings to find a more suitable AP 302 with which to associate. For example, a STA 304 that is moving relative to its associated AP 302 may perform a "roaming" scan to find another AP 302 having more desirable network characteristics such as a greater RSSI or a reduced traffic load.

In some cases, STAs 304 may form networks without APs 302 or other equipment other than the STAs 304 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 300. In such implementations, while the STAs 304 may be capable of communicating with each other through the AP 302 using communication links 306, STAs 304 also can communicate directly with each other via direct wireless links 307. Additionally, two STAs 304 may communicate via a direct communication link 307 regardless of whether both STAs 304 are associated with and served by the same AP 302. In such an ad hoc system, one or more of the STAs 304 may assume the role filled by the AP 302 in a BSS. Such a STA 304 may be referred to as a group owner (GO) and may coordinate transmissions within the ad hoc network. Examples of direct wireless links 307 include Wi-Fi Direct connections, connections established by using a Wi-Fi Tunneled Direct Link Setup (TDLS) link, and other P2P group connections.

The APs 302 and STAs 304 may function and communicate (via the respective communication links 306) according to the IEEE 802.11 family of standards (such as that defined by the IEEE 802.11-2016 specification or amendments thereof including, but not limited to, 802.11aa, 802.11ah, 802.11aq, 802.11ad, 802.11 ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs).

Each of the frequency bands may include multiple subbands or frequency channels. For example, PPDUs conforming to the IEEE 802.11n, 802.11ac, 802.11ax and 802.11be standard amendments may be transmitted over the 2.4 and 5 GHz bands, each of which is divided into multiple 20 MHz channels. As such, these PPDUs are transmitted over a physical channel having a minimum bandwidth of 20 MHz, but larger channels can be formed through channel bonding. For example, PPDUs conforming to the IEEE 802.11n, 802.11ac, 802.11ax, and 802.11be standard amendments may be transmitted over physical channels having bandwidths of 40 MHz, 80 MHz, 80+80 MHz, 160 MHz, 160+160 MHz or 320 MHz by bonding together two or more 20 MHz channels, which can be contiguously allocated or non-contiguously allocated. For example, IEEE 802.11n describes the use of up to 2 channels (for a combined 40 MHz bandwidth) and defined a High Throughput (HT) transmission format. IEEE 802.11ac describes the use of up to 8 channels (for a maximum combined 160 MHz bandwidth) and defined a Very High Throughput (VHT) transmission format. IEEE 802.11ax also supports up to a combined 160 MHz bandwidth (which may be a combination of up to 8 channels of 20 MHz width each). IEEE 802.11be may support up to a combined 320 MHz bandwidth (which may be a combination of up to 16 channels of 20 MHz width each).

The APs 302 and STAs 304 in the WLAN 300 may transmit PPDUs over an unlicensed spectrum, which may be a portion of spectrum that includes frequency bands traditionally used by Wi-Fi technology, such as the 2.4 GHz band, the 5 GHz band, the 60 GHz band, and the 900 MHz band. Some implementations of the APs 302 and STAs 304 described herein also may communicate in other frequency bands, such as the 6 GHz band, which may support both licensed and unlicensed communications. The APs 302 and STAs 304 also can be configured to communicate over other frequency bands such as shared licensed frequency bands, where multiple operators may have a license to operate in the same or overlapping frequency band or bands.

Each PPDU is a composite structure that includes a PHY preamble, a PHY header, and a payload in the form of a PLCP service data unit (PSDU). For example, the PSDU may include the PHY preamble and header (which may be referred to as PLCP preamble and header) as well as one or more MAC protocol data units (MPDUs). The information provided in the PHY preamble and header may be used by a receiving device to decode the subsequent data in the PSDU. In instances in which PPDUs are transmitted over a bonded channel, the preamble and header fields may be duplicated and transmitted in each of the multiple component channels. The PHY preamble may be used for packet detection, automatic gain control and channel estimation, among other uses. The format of, coding of, and information provided in the PHY header is based on the particular IEEE 802.11 protocol to be used to transmit the payload, and typically includes signaling fields (such as SIG-A and SIG-B fields) that include BSS and addressing information, such as a BSS color and a STA ID.

Figure 4:
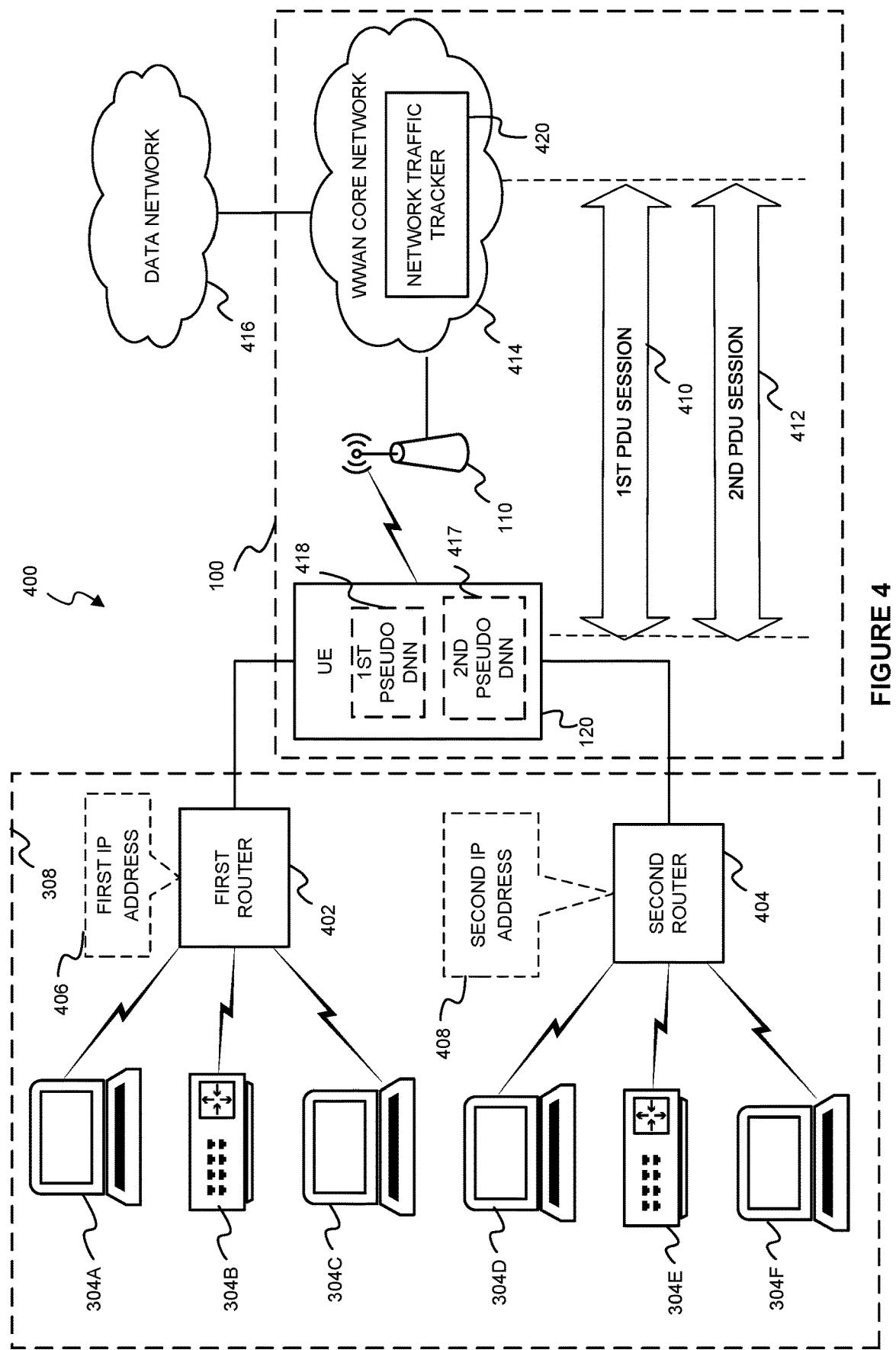
FIG. 4 is a diagram illustrating example operations for establishing protocol data unit (PDU) sessions to track network traffic of particular routers of a wireless wide area network (WLAN).

FIG. 4 is a diagram 400 illustrating example operations for establishing PDU sessions to track network traffic of particular routers of a WLAN 308. In the WWAN 100, a UE 120 may be wirelessly connected to a BS 110, or a component of a BS (such as one or more of a central unit (CU), a distributed unit (DU), or a radio unit (RU) in a disaggregated RAN (D-RAN) or open RAN (O-RAN) configuration), which may be connected to a WWAN core network 414. In some implementations, the BS 110 may be an example of a node or a network entity of the WWAN 100. In some implementations, the UE 120 may be an example of a node or a network entity of the WWAN 100. The WWAN core network 414 may be connected to a data network 416, such as the internet. The BS 110 may be a gNB and the WWAN core network 414 may be a 5G core (5GC) network. The UE 120 may be connected to a first router 402 and a second router 404 of the LAN 308 via wired or wireless connection. The first router 402 and second router 404 each may be a wireless router that includes an AP, such as the AP 302 described in FIG. 3. The first router 402 may be connected to STAs 304A-C via a wired or wireless connection. The second router 404 may be connected to STAs 304D-F via wired or wireless connection. The STAs 304A-F may be various types of devices of a LAN, such as mobile phones, desktop computers, laptop computers and gaming consoles.

The UE 120 may provide the STAs 304A-F of the LAN 308 with access to the WWAN 100 and the data network 416. In some implementations, the UE 120 may be configured with a different pseudo data name networks (DNNs) for each router of the LAN 308. For example, the UE 120 may associate a first pseudo DNN 418 with the first router 402 and a second pseudo DNN 417 with the second router 404. Hence, the first router 402 may use the first pseudo DNN 418 to access the WWAN 100, whereas the second router 404 may use the second pseudo DNN 417 to access the WWAN 100. The UE 120 also may assign a first IP address 406 to the first router 402 and a second IP address 408 to the second router 404. Hence, network traffic of the first router 402 may be associated with the first pseudo DNN 418 and the first IP address 406. Network traffic of the second router 404 may be associated with the second pseudo DNN 417 and the second IP address 408.

As noted, the UE 120 may assign an IP address to each router of the LAN 308. In some implementation, the UE 120 may assign a first private IPv4 address to the first router 402 and a second IPv4 address to the second router 404. The UE 120 may perform network address translation (NAT) on network traffic to and from each router that has been assigned a private IPv4 address. In some implementations, the UE 120 may assign a first globally routable IPv6 address to the first router 402 and second globally routable IPv6 address to the second router 404. For example, the UE 120 may share a first IPv6 prefix with the first router 402 and a second IPv6 prefix with the second router 404. The first router 402 may determine an IPv6 IID to combine with its IPv6 prefix, such as by using stateless address autoconfiguration (SLAAC). The second router 404 may similarly determine an IPv6 IID for its IPv6 prefix.

In some implementations, the first router 402 and second router 404 may assign IP addresses to the STAs 304A-F of the LAN 308. For example, the first router 402 may assign a different private IPv4 address to each of the STAs 304A-C. Similarly, the second router 404 may assign a different private IPv4 address to each of the STAs 304D-F. The first router 402 and the second router 404 may assign the private IPv4 addresses using dynamic host configuration protocol (DHCP). When the STAs 304A-F have private IPv4 addresses, the routers 402 and 404 may use NAT on network traffic to and from each of the STAs 304A-F. In some implementations, the first router 402 and the second router 404 may assign different globally routable IPv6 addresses to the STAs 304A-F. Each router may assign a globally routable IPv6 address to a STA by sharing an IPv6 prefix with the STA. For example, the first router 402 may share an IPv6 prefix (such as the IPv6 prefix assigned to the first router 402 by the UE 120) with the STA 304A. The STA 304A may determine an IPv6 IID to combine with the IPv6 prefix. For example, the STA 304A may use SLAAC to determine an IPv6 IID to combine with the IPv6 prefix to form the globally routable IPv6 address. When the STAs 304A-F have globally routable IPv6 addresses, the first router 402 and second router 404 may not perform NAT on network traffic to and from the STAs 304A-F.

After the UE 120 assigns IP addresses to the routers, the UE 120 may establish a different PDU session for each router of the LAN 308. Each PDU session may be used for transmitting network traffic from each router to the WWAN core network 414. Each PDU session also may be used for transmitting network traffic from the WWAN core network 414 to each router. For example, to transmit network traffic from the first router 402 to the WWAN core network 414, the UE 120 may establish a first PDU session 410. The UE 120 may assign a first PDU session ID to the first PDU session 410. In some implementations, the WWAN core network 414 may provide 5GC user plane (UP) services and control plane (CP) services that enable the UE 120 to establish PDU sessions, such as the first PDU session 410. The UE 120 may transmit the network traffic from the first router 402 to WWAN core network 414 over the first PDU session 410. The WWAN core network 414 may transmit this network traffic to the data network 416. As noted, this network traffic may be associated with the first IP address 406, first pseudo DNN 418 and first PDU session ID. The UE 120 also may establish a second PDU session 412 to transmit network traffic from the second router 404 to the WWAN core network 420. This network traffic may originate from the STAs 304D-F. The UE 120 may assign a second PDU session ID to the second PDU session 412. In some implementations, the WWAN core network 414 may provide 5GC user plane (UP) services and control plane (CP) services that enable the UE 120 to establish the second PDU session 412. The UE 120 may transmit network traffic from the second router 404 to the WWAN core network 414 over the second PDU session 412. The WWAN core network 414 may transmit this network traffic to the data network 416. The UE 120 also may transmit network traffic from the WWAN core network 420 to the second router 404 over the second PDU session 412. As noted, this network traffic may be associated with the second IP address 408, second pseudo DNN 417 and second PDU session ID.

Since each router of the LAN 308 may be associated with a unique public IP address and distinct PDU session ID, the WWAN core network 414 may track network traffic for each router of the LAN 308. For example, the WWAN core network 414 may include a network traffic tracker 420 that can track the amount of network traffic flowing to and from the first router 402 over the first PDU session 410. The network traffic tracker 420 may generate network traffic information based on the amount of network traffic associated with the first PDU session 410. The network traffic tracker 420 may aggregate network traffic information for all PDU sessions associated with the first router 402. Hence, the network traffic tracker 420 may generate network traffic information that tracks all network traffic for the first router 402. The network traffic tracker may, for example, generate billing information particularly based on the network traffic information for the first router 402. For example, the network traffic tracker 420 may generate a fee bill for a subscriber associated with the first router 402, where the fee bill is based on the amount of network traffic going to and from the first router 402. The network traffic tracker may perform operations for generating network traffic information and billing information for any router on the WLAN 308. In some implementations, the WWAN core network 414 may leverage its ability to attribute network traffic to particular routers of the LAN 308 for other purposes, such as to track network performance and to provide particular services to particular routers of the LAN 308.

Figure 5:
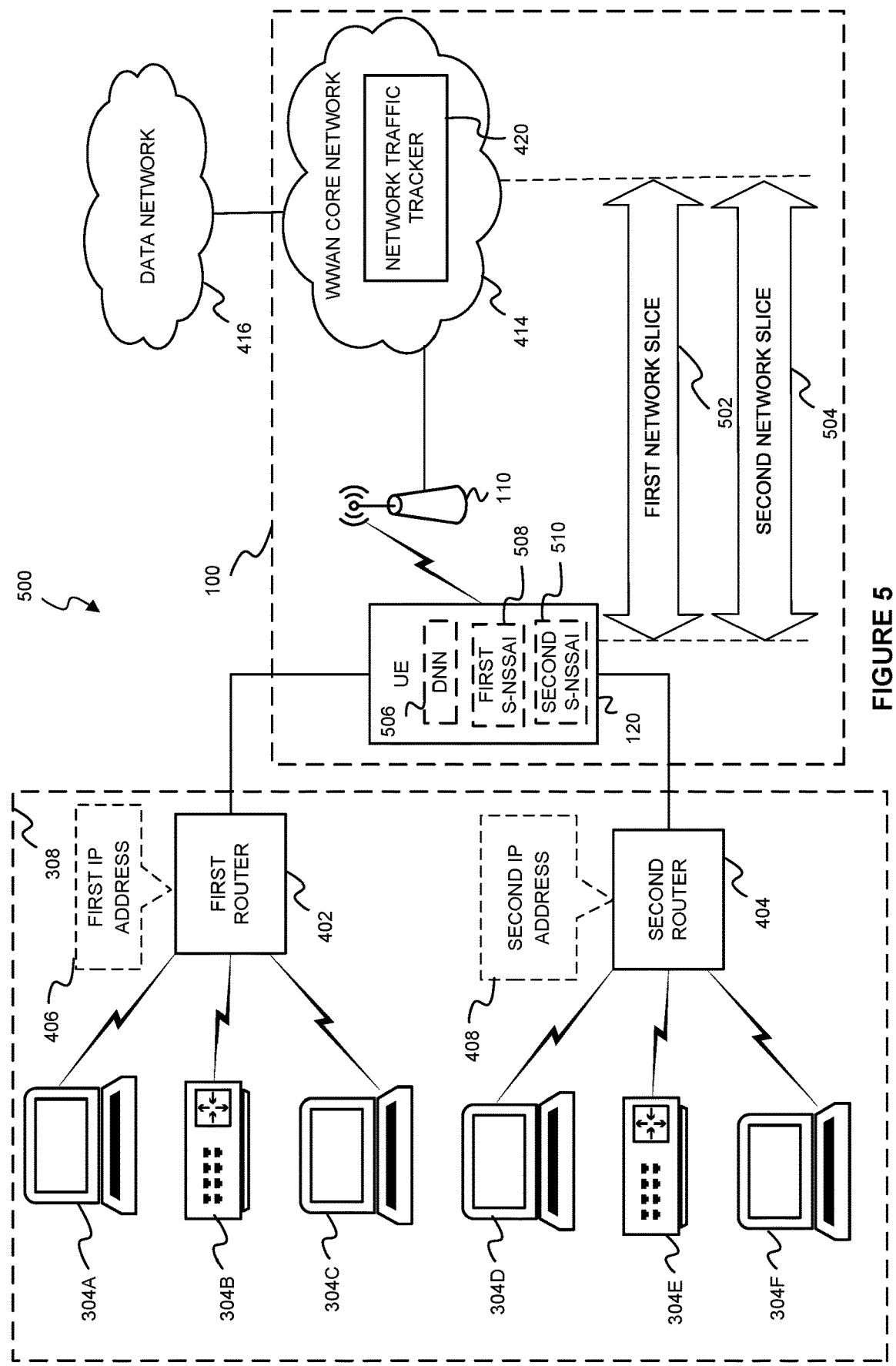
FIG. 5 is a diagram illustrating example operations for using network slicing to track network traffic of particular routers of the WLAN.

FIG. 5 is a diagram 500 illustrating example operations for using network slicing to track network traffic of particular routers of the WLAN 308. Network slicing is a network architecture that enables multiple virtualized and independent logical networks on the same physical network infrastructure, such as on the WWAN core network 414 and BS 110. Each network slice may be an isolated end-to-end network supporting specific services, such as enhanced mobile broadband (eMBB), ultra-low latency communication (URLLC) and massive machine type communication (MMTC). Network slices may be dynamically created. Each network slice may be uniquely identified by a single network slice selection assistance information (S-NSSAI). FIG. 5 illustrates the LAN 308, WWAN 100 and data network 416, as described with reference to FIG. 4.

The STAs 304A-F may request access to the WWAN 100. In response, the routers may request access to the WWAN 100 from the UE 120. For example, the first router 402 may transmit a request to access the WWAN 100 to the UE 120. The request may include a DNN 506. In response, the UE 120 may assign the first IP address 406 to the first router 402. The first IP address 406 may be a globally routable IP address, such as IPv6 address. After assigning the first IP address 406, the UE 120 may establish a first network slice for the first router 402. For example, the UE 120 may establish a first network slice 502 for network traffic transmitted to and from the first router 402. The first network slice 502 may be associated with a first S-NSSAI 508, which uniquely identifies the first network slice 502. The first network slice 502 also may be associated with the first IP address 406 and the DNN 506.

The UE 120 also may assign the second IP address 408 to the second router 404. The second IP address 408 may be a globally routable IP address, such as IPv6 address. After assigning the second IP address 408, the UE 120 may establish a second network slice 504 for the second router 404. The second network slice 504 may be used for network traffic transmitted to and from the second router 404. The second network slice 504 may be associated with a second S-NSSAI 510, which uniquely identifies the second network slice 504. The second network slice 504 also may be associated with the second IP address 408 and the DNN 506.

Since each router of the LAN 308 may be associated with a unique public IP address and a unique S-NSSAI, the WWAN core network 414 may track network traffic for each router of the LAN 308. For example, the network traffic tracker 420 may track the amount of network traffic flowing to and from the first router 402 over the first network slice 502. The network traffic tracker 420 may generate network traffic information based on the amount of network traffic associated with the first network slice 502. The network traffic tracker 420 may aggregate network traffic information for all network slices associated with the first router 402. Hence, the network traffic tracker 420 may generate network traffic information that tracks all network traffic for the first router 402. The network traffic tracker may generate billing information particularly based on the network traffic information for the first router 402. For example, the network traffic tracker 420 may generate a fee bill for a subscriber associated with the first router 402, where the fee bill is based on the amount of network traffic going to and from the first router 402. The network traffic tracker may perform operations for generating network traffic information and billing information for any router on the WLAN 304. In some implementations, the WWAN core network 414 may leverage its ability to attribute network traffic to particular routers of the LAN 308 for other purposes, such as to track network performance and to provide particular services to particular routers of the LAN 308.

Figure 6:
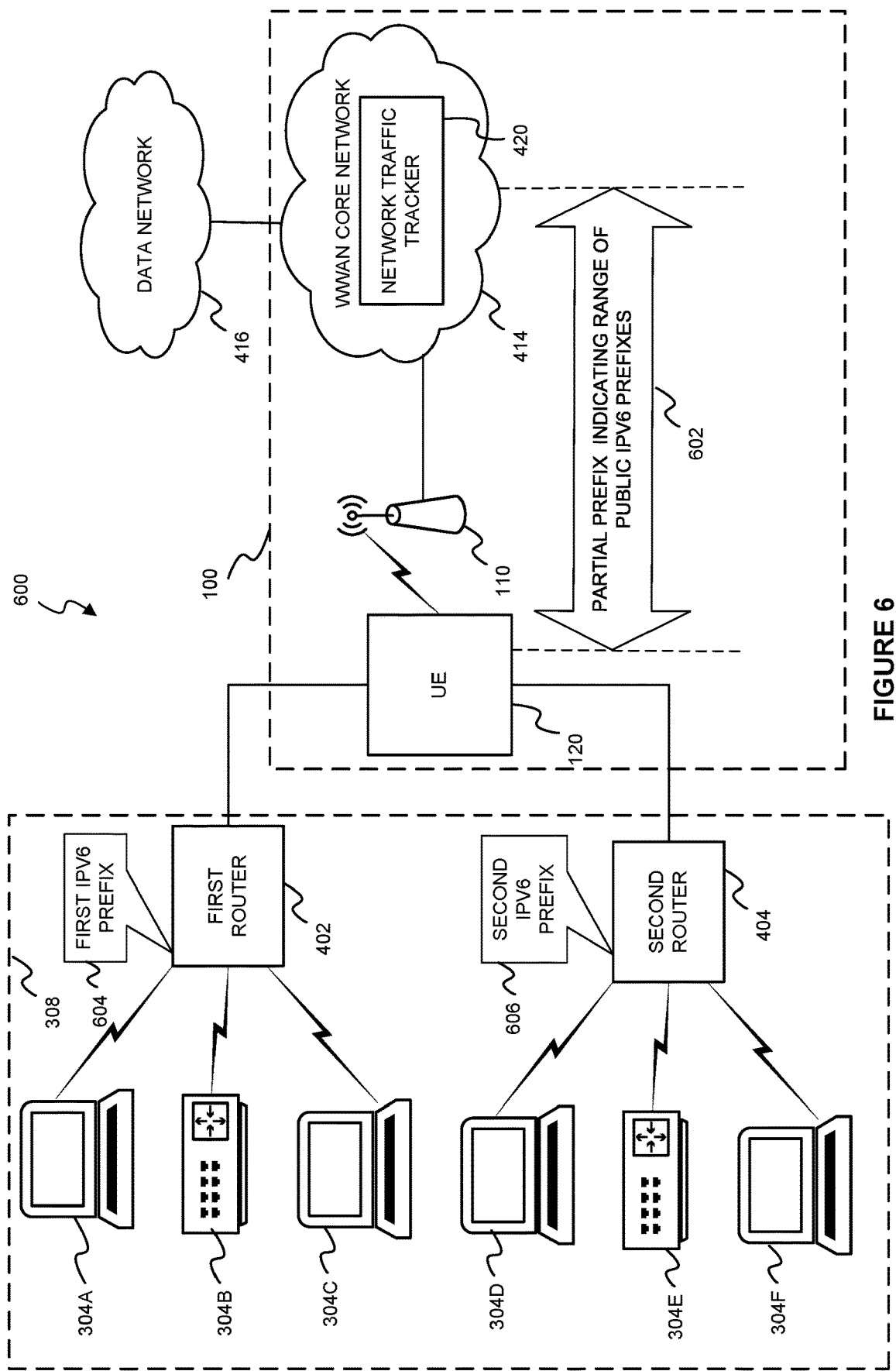
FIG. 6 is a diagram illustrating example operations for using aspects of internet protocol version 6 (IPv6) addressing to track network traffic of particular routers of the WLAN.

FIG. 6 is a diagram 600 illustrating example operations for using aspects of IPv6 addressing to track network traffic of particular routers of the WLAN 308. FIG. 6 illustrates the LAN 308, WWAN 100 and data network 416, as described with reference to FIG. 4. IPv6 addresses are typically represented in 128 bits. IPv6 addresses may include an IPv6 prefix and an IPv6 IID. The IPv6 prefix and IPv6 IID may vary in length. In some implementations, IPv6 addresses may include a 64-bit IPv6 prefix and 64-bit IPv6 IID. The WWAN core network 414 may configure the UE 120 with a partial prefix indicating a range of IPv6 prefixes that may be assigned to routers of the LAN 308. For example, the WWAN core network 414 may transmit a partial prefix 602 to the UE 120. The partial prefix may be any suitable length, such as 60 bits. Given that partial prefix 602 may include 60 bits, the UE 120 may determine the remaining 4 bits to form a unique 64-bit IPv6 prefix. After determining the unique 64-bit IPv6 prefix, the UE 120 may assign the IPv6 prefix to a router of the LAN 308. The partial prefix 602 may enable the UE 120 to determine a unique 64-bit prefix for each router of the LAN 308. Hence, routers of the LAN 308 may not share IP addresses. In this example, the partial prefix is 60 bits. Using a 60-bit partial prefix, the UE 120 may derive sixteen unique IPv6 prefixes. Although this example describes a 60-bit partial prefix, the partial prefix may be any suitable length. In some implementations, the length of the partial prefix may be selected based on the number of routers connected to the UE 120. For example, the LAN 308 includes only two routers (the first router 402 and the second router 404), so a partial prefix of 63 bits would allow the UE 120 to assign a different unique IPv6 prefix to each of the first router 402 and the second router 404.

As noted, the STAs 304A-F may request access to the WWAN 100. In response, the routers may request access to the WWAN 100 from the UE 120. For example, the first router 402 may transmit a request to connect to the UE 120. In response, the UE 120 may determine a first IPv6 prefix 604 based on the partial prefix 602 received from the WWAN core network 414. The UE 120 may assign the first IPv6 prefix 604 to the first router 402. In some implementations, the UE 120 may assign the first IPv6 prefix 604 via router advertisement or DHCPv6. The first router 402 also may determine an IPv6 IID to form a first IPv6 address. In some implementations, the first router may determine the IPv6 IID using SLAAC or DHCPv6. The first IPv6 address may include the first IP prefix 604 and the IPv6 IID. Network traffic transmitted to and from the first router 402 may be associated with the first IPv6 prefix 604, or the first IPv6 address having the unique IPv6 prefix (the first IPv6 prefix 604), or both.

The second router 404 may transmit a request to access the WWAN 100 to the UE 120. In response, the UE 120 may determine a second IPv6 prefix 606 based on the partial prefix 602 received from the WWAN core network 414. The UE 120 may assign the second IP prefix 606 to the second router 404. The second router 404 may determine an IPv6 IID to form a second IPv6 address. In some implementations, the first router may determine the IPv6 IID using SLAAC or DHCPv6. The first IPv6 address may include the second IP prefix 606 and the IPv6 IID. Network traffic transmitted to and from the second router 404 may be associated with the second IPv6 prefix 606, or the second IPv6 address having the unique IPv6 prefix (the second IPv6 prefix 606), or both.

In some implementations, the first router 402 and second router 404 may assign private IP addresses to the STAs 304A-F. For example, the first router 402 may assign a different private IP address to each of the STAs 304A-C. Similarly, the second router 404 may assign a different private IP address to each of the STAs 304D-F. In some implementations, the first router 402 and second router 404 may assign the private IP addresses using DHCP or SLAAC. When the STAs 304A-F have private IP addresses, the first router 402 and second router 404 may use NAT on network traffic to and from each of the STAs 304A-F.

Since each router of the LAN 308 may be associated with a unique IPv6 address based on having a unique IPv6 prefix, the WWAN core network 414 may track network traffic for each router of the LAN 308. For example, the network traffic tracker 420 may track the amount of network traffic flowing to and from the first IPv6 prefix 604 associated with the first router 402. The network traffic tracker 420 may generate network traffic information based on the amount of network traffic associated with the first IPv6 prefix 604. The network traffic tracker 420 may aggregate network traffic information associated with the first IPv6 prefix 604. Hence, the network traffic tracker 420 may generate network traffic information that tracks all network traffic for the first router 402. The network traffic tracker may generate billing information particularly based on the network traffic information for the first router 402. For example, the network traffic tracker 420 may generate a fee bill for a subscriber associated with the first router 402, where the fee bill is based on the amount of network traffic going to and from the first router 402. The network traffic tracker may perform operations for generating network traffic information and billing information for any router on the WLAN 308. In some implementations, the WWAN core network 414 may leverage its ability to attribute network traffic to particular routers of the LAN 308 for other purposes, such as to track network performance and to provide particular services to particular routers of the LAN 308.

FIG. 7 is a diagram 700 illustrating example operations for using aspects of IPv6 addressing to track network traffic of particular routers of the WLAN 308. FIG. 7 illustrates the LAN 308, WWAN 100 and data network 416, as described with reference to FIG. 4. As noted, IPv6 addresses are represented in 128 bits. IPv6 addresses include an IPv6 prefix and an IPv6 IID. The IPv6 prefix and IPv6 IID may vary in length. In some implementations, IPv6 addresses may include a 64-bit IPv6 prefix and 64-bit IPv6 IID.

The WWAN core network 414 may configure the UE 120 with an IPv6 prefix 702 (such as a 64-bit IPv6 prefix) to be assigned to each router of the LAN 308. The UE 120 may determine a unique LAN ID for each router. The LAN ID may be an n-bit string (such as 4-bit string) to be used as the first n bits of an IPv6 IID. The UE 120 may assign the 64-bit IPv6 prefix 702 and a different unique LAN ID to each router of the LAN 308. For example, the UE may assign the 64-bit IPv6 prefix 702 and a first unique LAN ID 704 to the first router 402. As noted, the LAN ID may be used as the first n bits (such as 4 bits) of an IPv6 IID for the first router 402. The first router 402 may use DHCPv6 or SLAAC to determine the remaining bits (such as the remaining 60 bits) of its unique IPv6 IID. Hence, the first router 402 may have an IPv6 address including the IPv6 prefix 702 and the first LAN ID 704. While this example describes a 4-bit LAN ID, the LAN ID may be any suitable length. In some implementations, the length of the LAN ID may be selected based on the number of routers connected to the UE 120. For example, the LAN 308 includes only two routers (the first router 402 and the second router 404), so a 1-bit LAN ID would allow the UE 120 to assign a different unique LAN ID to each of the first router 402 and the second router 404.

The UE also may assign the 64-bit IPv6 prefix 702 and a second LAN ID 706 to the second router 404. As noted, the LAN ID may be used as the first n bits (such as 4 bits) of an IPv6 IID for the second router 404. The second router 404 may use DHCPv6 or SLAAC to determine the remaining bits (such as the remaining 60 bits) of its unique IPv6 IID. Hence, the second router 404 may have an IPv6 address including the IPv6 prefix 702 and the second LAN ID 706.

Since each router of the LAN 308 may be associated with a unique LAN ID, the WWAN core network 414 may track network traffic for each router of the LAN 308. For example, the network traffic tracker 420 may track the amount of network traffic flowing to and from the first LAN ID 704 associated with the first router 402. The network traffic tracker 420 may generate network traffic information based on the amount of network traffic associated with the first LAN ID 704. The network traffic tracker 420 may aggregate network traffic information associated with the first LAN ID 704. Hence, the network traffic tracker 420 may generate network traffic information that tracks all network traffic for the first router 402. The network traffic tracker may generate billing information particularly based on the network traffic information for the first router 402. For example, the network traffic tracker 420 may generate a fee bill for a subscriber associated with the first router 402, where the fee bill is based on the amount of network traffic going to and from the first router 402. The network traffic tracker may perform operations for generating network traffic information and billing information for any router on the WLAN 308. In some implementations, the WWAN core network 414 may leverage its ability to attribute network traffic to particular routers of the LAN 308 for other purposes, such as to track network performance and to provide particular services to particular routers of the LAN 308.

FIG. 8 is a diagram 800 illustrating example operations for using tunneling to track network traffic of particular routers of the WLAN 308. FIG. 8 illustrates the LAN 308, WWAN 100 and data network 416, as described with reference to FIG. 4. FIG. 8 also illustrates the UE 120 including a tunnel client 822 and a tunnel server 820 connected to the WWAN core network 414 via a wired or wireless connection. In some implementations, the UE 120 utilizes the tunnel client 822 to perform operations for transmitting and receiving network traffic over tunnels, as described herein.

The UE 120 may establish a tunnel with the tunnel server 820. To track network traffic of the LAN 308, the UE 120 may utilize a separate instance of the tunnel for each router of the LAN 308. For example, the UE 120 may transmit network traffic of the first router 402 to the WWAN 100 over a first tunnel instance 810. The UE 120 also may transmit network traffic of the second router 404 to the WWAN 100 over a second tunnel instance 811. Network traffic transmitted over each tunnel instance may be associated with a unique tunnel instance ID. Each tunnel instance ID may be associated with a particular router of the LAN 308. For example, all network traffic transmitted over the first tunnel instance 810 may be associated with a first tunnel instance ID 830, and all network traffic transmitted over the second tunnel instance 811 may be associated with a second tunnel instance ID 832. The UE 120 or the WWAN core network 414 may store tunnel information indicating the associated between the first tunnel instance ID 830 and the first router 402 and the second tunnel instance ID 832 and the second router 404. As various network traffic passes through the WWAN core network 414, the network traffic tracker 420 may attribute portions of the network traffic to specific routers of the LAN 308 based on tunnel instance IDs associated with the network traffic.

Before the routers on the LAN 308 utilize tunnels, the UE 120 may assign an IP address to each router of the LAN 308. For example, the UE 120 may assign a first IP address 406 to the first router 402 and a second IP address 408 to the second router 404. In some implementation, the first IP address 406 and the second IP address 408 are private IPv4 addresses. For private IPv4 addresses, the UE 120 may perform NAT on network traffic to and from each router that has been assigned a private IPv4 address. In some implementations, the first IP address 406 and second IP address 408 are globally routable IPv6 addresses. For example, the UE 120 may share a first IPv6 prefix with the first router 402 and a second IPv6 prefix with the second router 404. The first router 402 may select, identify or determine an IPv6 IID to combine with its IPv6 prefix, such as by using SLAAC or DHCPv6. The second router 404 may similarly select, identify or determine an IPv6 IID for its IPv6 prefix.

In some implementations, the first router 402 and second router 404 may assign IP addresses to the STAs 304A-F of the LAN 308. For example, the first router 402 may assign a different private IPv4 address to each of the STAs 304A-C. Similarly, the second router 404 may assign a different private IPv4 address to each of the STAs 304D-F. The first router 402 and the second router 404 may assign the private IPv4 addresses using DHCP. When the STAs 304A-F have private IPv4 addresses, the routers 402 and 404 may use NAT on network traffic to and from each of the STAs 304A-F. In some implementations, the first router 402 and the second router 404 may assign different globally routable IPv6 addresses to the STAs 304A-F. Each router may assign a globally routable IPv6 address to a STA by sharing an IPv6 prefix with the STA. For example, the first router 402 may share an IPv6 prefix (such as the IPv6 prefix assigned to the first router 402 by the UE 120) with the STA 304A. The STA 304A may determine an IPv6 IID to combine with the IPv6 prefix. For example, the STA 304A may use SLAAC or DHCPv6 to determine an IPv6 IID to combine with the IPv6 prefix to form the globally routable IPv6 address. When the STAs 304A-F have globally routable IPv6 addresses, the first router 402 and second router 404 may not perform NAT on network traffic to and from the STAs 304A-F.

After the UE 120 has assigned IP addresses to the routers of the LAN 308, the UE 120 may establish a separate tunnel instance for each router. The UE 120 may utilize any suitable tunneling protocol, such as the Generic Routing Encapsulation (GRE) tunneling protocol or the IP-in-IP tunneling protocol. For example, the UE 120 may create the first tunnel instance ID 830 for the first tunnel instance 810 associated with the first router 402. The UE 120 also may create a second tunnel instance ID 832 for a second tunnel instance 811 associated with the second router 404. As UE 120 receives network traffic from routers of the LAN 308, the UE 120 may encapsulate the network traffic according to a tunneling protocol (such as GRE or IP-in-IP). For example, the UE 120 may receive a first IP packet from the first router 402. The UE 120 may encapsulate the first IP packet into an encapsulated packet 812. The encapsulated packet 812 may include an outer header 821, tunnel instance ID 814, tunnel header 815, inner IP header 816 and payload 818. The outer header 821 may include a source IP address (such as an IP address of the UE 120) and an IP address of the tunnel server 820. The tunnel instance ID 814 may be the first tunnel instance ID 830 associated with the first tunnel instance and the first router 402. The tunnel header 815 may indicate the tunneling protocol (such as GRE) and information related to carrying network traffic through the tunnel (such as check sum information and sequence number information). The inner IP header 816 may include a source IP address (such as an IP address of the router 402) and a destination IP address (such as an internet website address). The payload 818 may include a payload of the first IP packet received from the first router 402. The UE 120 may transmit the encapsulated packet 812 to the WWAN core network 414 over the first tunnel instance 810. The WWAN core network 414 may transmit the encapsulated packet 812 to the tunnel server 820 over the first tunnel instance 810. The tunnel server 820 may decapsulate the encapsulated packet 812 to form the original first IP packet and transmit the first IP packet to the destination address indicated in the inner IP header 816.

The UE 120 may similarly perform operations for receiving, generating or creating encapsulated packets 812 for network traffic of the second router 404. The UE 120 may transmit encapsulated packets associated with the second router 404 and second tunnel instance ID 832 over the second tunnel 811.

The UE 120 may decapsulate network traffic received from the tunnel server 820. For example, the UE 120 may receive an encapsulated packet 812 from the tunnel server 820 over the first tunnel instance 810. The UE 120 may decapsulate the encapsulated packet 812. For example, the UE 120 may form an IP packet by removing the outer IP header 821, tunnel ID 814 and tunnel header 816 of the encapsulated packet. The UE 120 may transmit the IP packet to the first router 402, which may transmit the IP packet to one of the STAs 304A-C. The UE 120 may perform similar operations for encapsulated packets received over the second tunnel instance 811.

Since each router of the LAN 308 may be associated with a unique tunnel instance ID, the WWAN core network 414 may track network traffic for each router of the LAN 308. For example, the network traffic tracker 420 may track the amount of network traffic flowing to and from the first router 402 based on the first tunnel instance ID 830. The network traffic tracker 420 may generate network traffic information based on the amount of network traffic associated with the first tunnel instance ID 830. The network traffic tracker 420 may aggregate network traffic information associated with the first tunnel instance ID 830. Hence, the network traffic tracker 420 may generate network traffic information that tracks all network traffic for the first router 402. The network traffic tracker may generate billing information particularly based on the network traffic information for the first router 402. For example, the network traffic tracker 420 may generate a fee bill for a subscriber associated with the first router 402, where the fee bill is based on the amount of network traffic going to and from the first router 402. The network traffic tracker may perform operations for generating network traffic information and billing information for any router on the WLAN 308. In some implementations, the WWAN core network 414 may leverage its ability to attribute network traffic to particular routers of the LAN 308 for other purposes, such as to track network performance and to provide particular services to particular routers of the LAN 308.

FIG. 9 depicts a process 900 illustrating example operations performed by a node for communicating in a WWAN.

At block 910, the first node may assign a first public IP address to a first router of a LAN and a second public IP address to a second router of the LAN.

At block 920, the first node may transmit first network traffic associated with the first public IP address over a WWAN and second network traffic associated with the second IP address over the WWAN.

FIG. 10 depicts a process 1000 illustrating example operations performed by a node for communicating in a WWAN.

At block 1010, the first node may receive first network traffic from a first internet protocol (IP) address associated with a first router of a LAN and second network traffic from a second IP address associated with a second router of the LAN.

At block 1020, the first node may transmit first encapsulated packets via a first tunnel instance of a tunnel and second encapsulated packets via a second tunnel instance of the tunnel over a WWAN to a second node, where an IP address of the first node is a source IP address of the first encapsulated packets and the second encapsulated packets.

Figure 11:
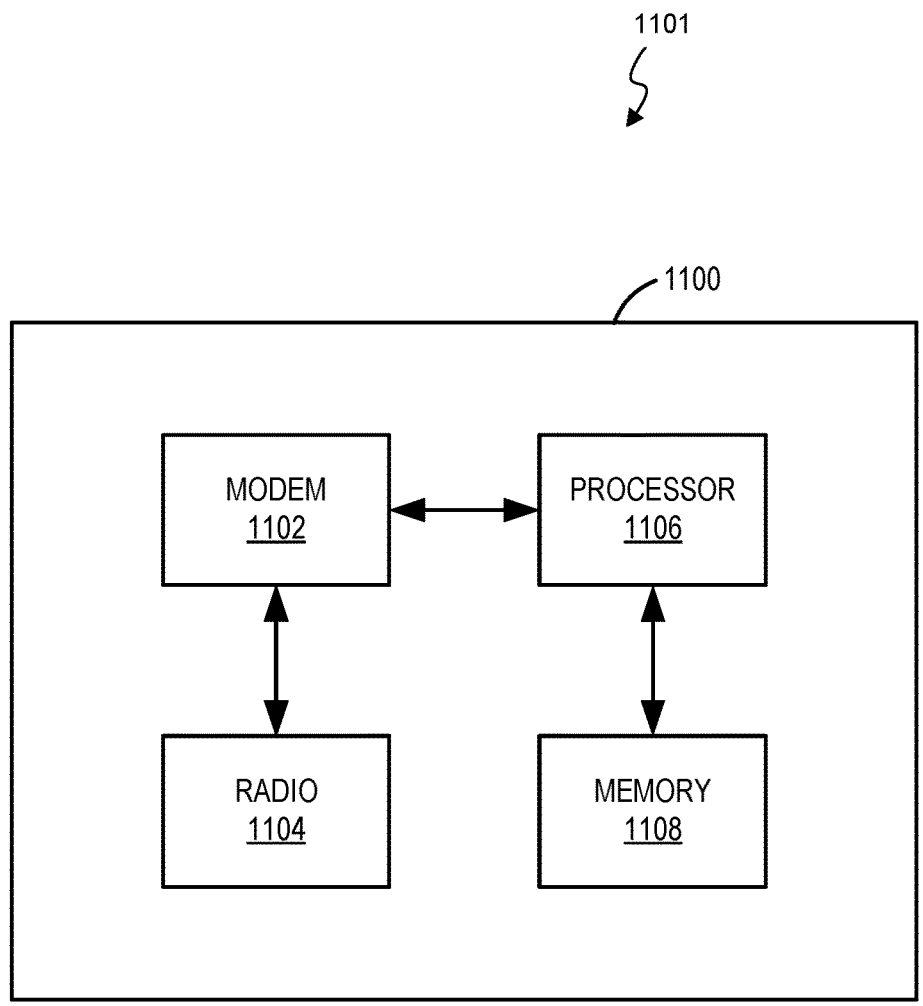
FIG. 11 shows a block diagram of an example wireless communication apparatus.

FIG. 11 shows a block diagram 1101 of an example wireless communication apparatus 1100. In some implementations, the wireless communication apparatus 1100 can be an example of a device for use in a UE, such as the UE 120 described with reference to FIGS. 4-8. In some implementations, the wireless communication apparatus 1100 can be an example of a device for use in a BS, such as the BS 110 described with reference to FIG. 2. The wireless communication apparatus 1100 is capable of transmitting (or outputting for transmission) and receiving wireless communications.

The wireless communication apparatus 1100 can be, or can include, a chip, system on chip (SoC), chipset, package or device. The term "system-on-chip" (SoC) is used herein to refer to a set of interconnected electronic circuits typically, but not exclusively, including one or more processors, a memory, and a communication interface. The SoC may include a variety of different types of processors and processor cores, such as a general purpose processor, a central processing unit (CPU), a digital signal processor (DSP), a graphics processing unit (GPU), an accelerated processing unit (APU), a subsystem processor, an auxiliary processor, a single-core processor, and a multicore processor. The SoC may further include other hardware and hardware combinations, such as a field programmable gate array (FPGA), a configuration and status register (CSR), an application-specific integrated circuit (ASIC), other programmable logic device, discrete gate logic, transistor logic, registers, performance monitoring hardware, watchdog hardware, counters, and time references. SoCs may be integrated circuits (ICs) configured such that the components of the IC reside on the same substrate, such as a single piece of semiconductor material (such as, for example, silicon).

The term "system in a package" (SIP) is used herein to refer to a single module or package that may contain multiple resources, computational units, cores or processors on two or more IC chips, substrates, or SoCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SoCs coupled together via high speed communication circuitry and packaged in close proximity, such as on a single motherboard or in a single wireless node. The proximity of the SoCs facilitates high speed communications and the sharing of memory and resources.

The term "multicore processor" is used herein to refer to a single IC chip or chip package that contains two or more independent processing cores (for example a CPU core, IP core, GPU core, among other examples) configured to read and execute program instructions. An SoC may include multiple multicore processors, and each processor in an SoC may be referred to as a core. The term "multiprocessor" may be used herein to refer to a system or device that includes two or more processing units configured to read and execute program instructions.

The wireless communication apparatus 1100 may include one or more modems 1102. In some implementations, the one or more modems 1102 (collectively "the modem 1102") may include a WWAN modem (for example, a 3GPP 4G LTE or 5G compliant modem). In some implementations, the wireless communication apparatus 1100 also includes one or more radios 1104 (collectively "the radio 1104"). In some implementations, the wireless communication apparatus 1100 further includes one or more processors, processing blocks or processing elements 1106 (collectively "the processor 1106") and one or more memory blocks or elements 1108 (collectively "the memory 1108").

The modem 1102 can include an intelligent hardware block or device such as, for example, an application-specific integrated circuit (ASIC) among other possibilities. The modem 1102 is generally configured to implement a PHY layer. For example, the modem 1102 is configured to modulate packets and to output the modulated packets to the radio 1104 for transmission over the wireless medium. The modem 1102 is similarly configured to obtain modulated packets received by the radio 1104 and to demodulate the packets to provide demodulated packets. In addition to a modulator and a demodulator, the modem 1102 may further include digital signal processing (DSP) circuitry, automatic gain control (AGC), a coder, a decoder, a multiplexer and a demultiplexer. For example, while in a transmission mode, data obtained from the processor 1106 is provided to a coder, which encodes the data to provide encoded bits. The encoded bits are mapped to points in a modulation constellation (using a selected MCS) to provide modulated symbols. The modulated symbols may be mapped to a number NSS of spatial streams or a number NSTS of space-time streams. The modulated symbols in the respective spatial or space-time streams may be multiplexed, transformed via an inverse fast Fourier transform (IFFT) block, and subsequently provided to the DSP circuitry for Tx windowing and filtering. The digital signals may be provided to a digital-to-analog converter (DAC). The resultant analog signals may be provided to a frequency upconverter, and ultimately, the radio 1104. In implementations involving beamforming, the modulated symbols in the respective spatial streams are precoded via a steering matrix prior to their provision to the IFFT block.

While in a reception mode, digital signals received from the radio 1104 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are fed to the demultiplexer for demultiplexing. The demultiplexed bits may be descrambled and provided to the MAC layer (the processor 1106) for processing, evaluation, or interpretation.

The radio 1104 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication apparatus 1100 can include, or be coupled with, multiple transmit antennas (each with a corresponding transmit chain) and multiple receive antennas (each with a corresponding receive chain). The symbols output from the modem 1102 are provided to the radio 1104, which transmits the symbols via the coupled antennas. Similarly, symbols received via the antennas are obtained by the radio 1104, which provides the symbols to the modem 1102.

The processor 1106 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 1106 processes information received through the radio 1104 and the modem 1102, and processes information to be output through the modem 1102 and the radio 1104 for transmission through the wireless medium. In some implementations, the processor 1106 may generally control the modem 1102 to cause the modem to perform various operations described throughout.

The memory 1108 can include tangible storage media such as random-access memory (RAM) or read-only memory (ROM), or combinations thereof. The memory 1108 also can store non-transitory processor- or computer-executable software (SW) code containing instructions that, when executed by the processor 1106, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

In some implementations, the processor 1106 and the memory 1108 of the wireless communication apparatus 1100 may be referred to as a processing system. A processing system may generally refer to a system or series of machines or components that receives inputs and processes the inputs to produce a set of outputs (which may be passed to other systems or components of, for example, one of the UEs 120 or one of the BSs 110). In some implementations, the processing system may include the processor 1106, the memory 1108, and one or more other components of the wireless communication apparatus 1100, such as the modem 1102.

In some implementations, the processing system of a UE 120 may interface with other components of the UE 120, and may process information received from other components (such as inputs or signals), output information to other components, etc. For example, a chip or modem of the UE 120 (such as the wireless communication apparatus 1100) may include a processing system, a first interface to receive or obtain information, and a second interface to output, transmit or provide information. In some cases, the first interface may refer to an interface between the processing system of the chip or modem and a receiver, such that the UE 120 may receive information or signal inputs, and the information may be passed to the processing system. In some cases, the second interface may refer to an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit or provide information.

In some implementations, the processing system of a BS 110 may interface with other components of the BS 110, and may process information received from other components (such as inputs or signals), output information to other components, etc. For example, a chip or modem of the BS 110 (such as the wireless communication apparatus 1100) may include a processing system, a first interface to receive or obtain information, and a second interface to output, transmit or provide information. In some cases, the first interface may refer to an interface between the processing system of the chip or modem and a receiver, such that the BS 110 may receive information or signal inputs, and the information may be passed to the processing system. In some cases, the second interface may refer to an interface between the processing system of the chip or modem and a transmitter, such that the BS 110 may transmit information output from the chip or modem. A person having ordinary skill in the art will readily recognize that the second interface also may obtain or receive information or signal inputs, and the first interface also may output, transmit or provide information.

Figure 12:
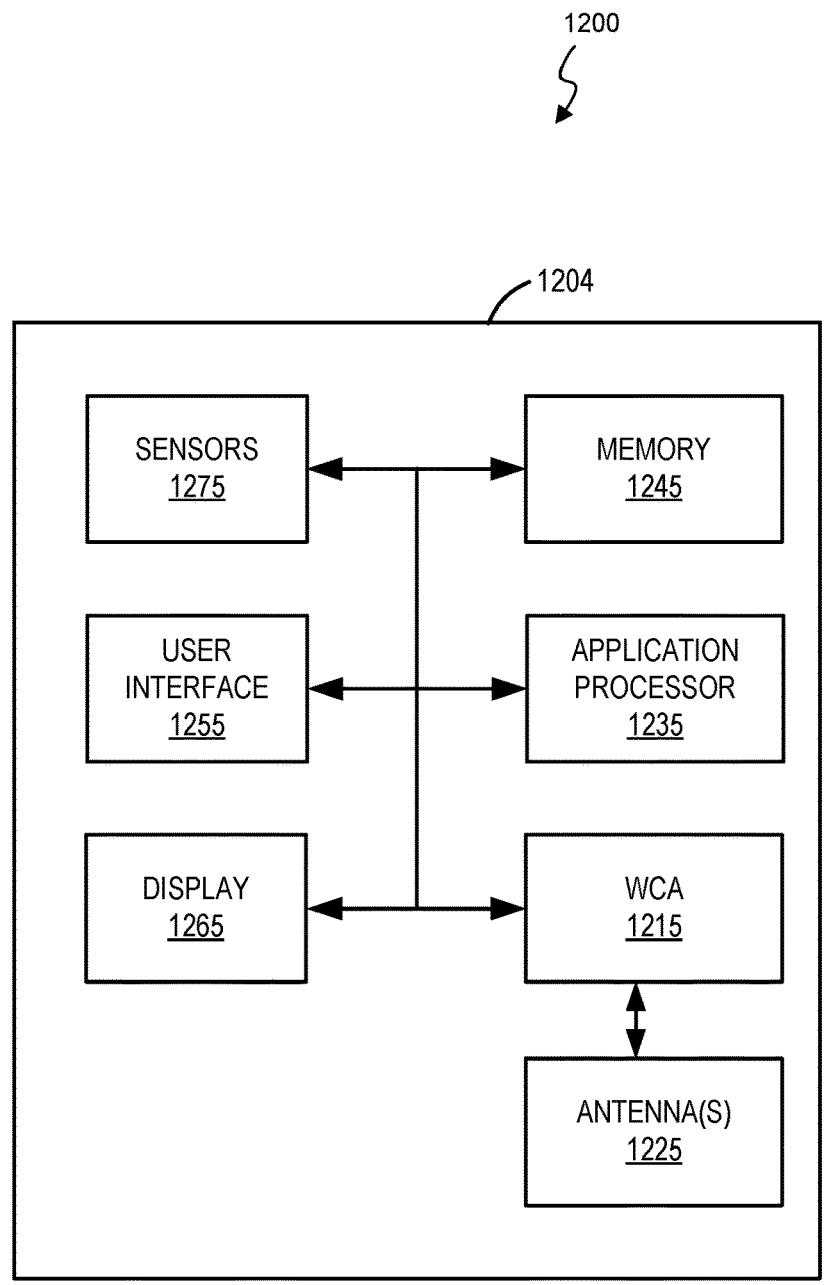
FIG. 12 shows a block diagram of an example wireless node.

FIG. 12 shows a block diagram 1200 of an example wireless node 1204. For example, the wireless node 1204 can be an example implementation of the UE 120 described herein. The wireless node 1204 includes a wireless communication apparatus (WCA) 1215. For example, the WCA 1215 may be an example implementation of the wireless communication apparatus 1100 described with reference to FIG. 11. The wireless node 1204 also includes one or more antennas 1225 coupled with the WCA 1215 to transmit and receive wireless communications. The wireless node 1204 additionally includes an application processor 1235 coupled with the WCA 1215, and a memory 1245 coupled with the application processor 1235. In some implementations, the wireless node 1204 further includes a UI 1255 (such as a touchscreen or keypad) and a display 1265, which may be integrated with the UI 1255 to form a touchscreen display. In some implementations, the wireless node 1204 may further include one or more sensors 1275 such as, for example, one or more inertial sensors, accelerometers, temperature sensors, pressure sensors, or altitude sensors. Ones of the aforementioned components can communicate with other ones of the components directly or indirectly, over at least one bus. The wireless node 1204 further includes a housing that encompasses the WCA 1215, the application processor 1235, the memory 1245, and at least portions of the antennas 1225, UI 1255, and display 1265.

FIGS. 1-12 and the operations described herein are examples meant to aid in understanding example implementations and should not be used to limit the potential implementations or limit the scope of the claims. Some implementations may perform additional operations, fewer operations, operations in parallel or in a different order, and some operations differently.

The foregoing disclosure provides illustration and description but is not intended to be exhaustive or to limit the aspects to the precise form disclosed. Modifications and variations may be made in light of the above disclosure or may be acquired from practice of the aspects. While the aspects of the disclosure have been described in terms of various examples, any combination of aspects from any of the examples is also within the scope of the disclosure. The examples in this disclosure are provided for pedagogical purposes. Alternatively, or in addition to the other examples described herein, examples include any combination of the following implementation options.

Clause 1. One innovative aspect of the subject matter described in this disclosure can be implemented in a method for communicating performed by a first node. The method may include assigning a first public IP address to a first router of a LAN and a second public IP address to a second router of the LAN. The method also may include transmitting first network traffic associated with the first public IP address over a WWAN and second network traffic associated with the second public IP address over the WWAN.

Clause 2. The method of clause 1, where the first node may be a modem of a UE of the WWAN.

Clause 3. The method of any one or more of clauses 1-2, further including configuring a first pseudo DNN for the first router and a second pseudo DNN for the second router.

Clause 4. The method of any one or more of clauses 1-3, where the WWAN is a 5G NR network and the LAN is a WLAN.

Clause 5. The method of any one or more of clauses 1-4, further including establishing a first PDU session for the first public IP address and a second PDU session for the second public IP address, the first network traffic being exchanged over the WWAN via the first PDU session and the second network traffic being exchanged over the WWAN via the second PDU session.

Clause 6. The method of any one or more of clauses 1-5, further including configuring a first pseudo DNN for the first router and a second pseudo DNN for the second router, where the first PDU session for the first public IP address is associated with the first pseudo DNN and the second PDU session for the second public IP address is associated with the second pseudo DNN.

Clause 7. The method of any one or more of clauses 1-6, further including establishing a first network slice of the WWAN for the first public IP address and a second network slice of the WWAN for the second public IP address, the first network traffic being exchanged over the WWAN via the first network slice and the second network traffic being exchanged over the WWAN via the second network slice.

Clause 8. The method of any one or more of clauses 1-7, where the first public IP address is a first IPv6 address and the second public IP address is a second IPv6 address. The method also may include configuring one or more bits of a first IPv6 prefix of the first IPv6 address and configuring one or more bits of a second IPv6 prefix of the second IPv6 address. The method also may include generating the first IPv6 address including the first IPv6 prefix and generating the second IPv6 address including the second IPv6 prefix.

Clause 9. The method of any one or more of clauses 1-8, where the first public IP address is a first IPv6 address and the second public IP address is a second IPv6 address. The method also may include receiving a first IPv6 prefix from a second node of the WWAN, and configuring one or more bits of a first IPv6 IID for the first IPv6 address. The method also may include configuring one or more bits of a second IPv6 IID for the second IPv6 address. The method also may include generating the first IPv6 address including the first IPv6 prefix and the first IID. The method also may include generating the second IPv6 address including the first IPv6 prefix and the second IID.

Clause 10. Another innovative aspect of the subject matter described in this disclosure can be implemented in a method for communicating performed by a first node. The method may include receiving first network traffic from a first IP address associated with a first router of a LAN and second network traffic from a second IP address associated with a second router of the LAN. The method also may include transmitting first encapsulated packets via a first tunnel instance of a tunnel and second encapsulated packets via the second tunnel instance of the tunnel over a WWAN to a second node. An IP address of the first node may be a source IP address of the first encapsulated packets and the second encapsulated packets.

Clause 11. The method of clause 10, where the second node includes a tunnel server.

Clause 12. The method of any one or more of clauses 10-11, further including encapsulating the first network traffic to generate the first encapsulated packets, where encapsulating the first network traffic includes encapsulating the first network traffic inside first GRE packets each including the first identifier for the first router. The method also may include encapsulating the second network traffic to generate the second encapsulated packets, where encapsulating the second network traffic includes encapsulating the second network traffic inside second GRE packets each including the second identifier for the second router.

Clause 13. The method of any one or more of clauses 10-12, further including determining a first amount of the first network traffic based on the first identifier and a second amount of network traffic based on the second identifier.

Clause 14. The method of any one or more of clauses 10-13, further including decapsulating third encapsulated packets received via the first tunnel instance to form third network traffic, and transmitting the third network traffic to the first IP address of the first router.

Clause 15. The method of any one or more of clauses 10-14, further including encapsulating the first network traffic to generate the first encapsulated packets, where encapsulating the first network traffic includes encapsulating the first network traffic inside first IP packets each including the first identifier for the first router. The method also may include encapsulating the second network traffic to generate the second encapsulated packets, where encapsulating the second network traffic includes encapsulating the second network traffic inside second IP packets each including the second identifier for the second router.

Clause 16. Another innovative aspect of the subject matter described in this disclosure can be implemented in an apparatus of a first node for wireless communication. The apparatus may include one or more processors configured to assign a first public IP address to a first router of a LAN and a second public IP address to a second router of the LAN. The apparatus also may include one or more interfaces configured to transmit first network traffic associated with the first public IP address over a WWAN and second network traffic associated with the second public IP address over the WWAN.

Clause 17. The apparatus of any one or more of clauses 1-9 and clause 16, where the first node is a modem of a UE of the WWAN.

Clause 18. The apparatus of any one or more of clauses 1-9 and 16-17, where the one or more processors also may be configured to configure a first pseudo DNN for the first router and a second pseudo DNN for the second router.

Clause 19. The apparatus of any one or more of clauses 1-9 and 16-18, where the one or more interfaces also may be configured to receive a first request to connect to the WWAN from the first router, where the first request includes the first pseudo DNN. The one or more interfaces also may be configured to receive a second request to connect to the WWAN from the second router, where the second request includes the second pseudo DNN.

Clause 20. The apparatus of any one or more of clauses 1-9 and 16-19, where the WWAN is a 5G NR network and the LAN is a WLAN.

Clause 21. The apparatus of any one or more of clauses 1-9 and 16-20, where the one or more processors may be configured to establish a first PDU session for the first public IP address and a second PDU session for the second public IP address, where the first network traffic may be exchanged over the WWAN via the first PDU session and the second network traffic may be exchanged over the WWAN via the second PDU session.

Clause 22. The apparatus of any one or more of clauses 1-9 and 16-21, where the one or more processors may be configured to configure a first pseudo DNN for the first router and a second pseudo DNN for the second router, and where the first PDU session for the first public IP address may be associated with the first pseudo DNN and the second PDU session for the second public IP address may be associated with the second pseudo DNN.

Clause 23. The apparatus of any one or more of clauses 1-9 and 16-22, where the first network traffic may be associated with a first PDU session ID and the second network traffic may be associated with a second PDU session ID. The one or more processors may be configured to determine a first amount of the first network traffic based on the first PDU session ID and a second amount of the second network traffic based on the second PDU session ID.

Clause 24. The apparatus of any one or more of clauses 1-9 and 16-23, where the first network traffic is associated with a first PDU session ID and the second network traffic is second PDU session ID. The one or more processors may be configured to determine a first amount of the first network traffic based on the first PDU session ID and a second amount of the second network traffic based on the second PDU session ID.

Clause 25. The apparatus of any one or more of clauses 1-9 and 16-24, where the first public IP address is a first IPv6 address and the second public IP address is a second IPv6 address. The one or more processors may be configured to configure one or more bits of a first IPv6 prefix of the first IPv6 address, and configure one or more bits of a second IPv6 prefix of the second IPv6 address. The one or more processors may be configured to generate the first IPv6 address including the first IPv6 prefix, and generate the second IPv6 address including the second IPv6 prefix.

Clause 26. The apparatus of any one or more of clauses 1-9 and 16-25, where the first public IP address is a first IPv6 address and the second public IP address is a second IPv6 address. The one or more interfaces may be configured to receive a first partial prefix associated with the first public IP address and a second partial prefix associated with the second public IP address from a second node on the WWAN. The one or more processors may be configured to configure one or more bits of the first partial prefix and one or more bits of the second partial prefix.

Clause 27. The apparatus of any one or more of clauses 1-9 and 16-26, where the first public IP address is a first IPv6 address and the second public IP address is a second IPv6 address. The one or more interfaces may be configured to receive a first IPv6 prefix from a second node of the WWAN. The one or more processors may be configured to configure one or more bits of a second IPv6 IID for the second IPv6 address. The one or more processors may be configured to generate the first IPv6 address including the first IPv6 prefix and the first IID, and generate the second IPv6 address including the first IPv6 prefix and the second IID.

Clause 28. Another innovative aspect of the subject matter described in this disclosure can be implemented in an apparatus of a first node for wireless communication. The apparatus may include one or more processors configured to implement the wireless communication. The apparatus also may include one or more interfaces configured to receive first network traffic from a first IP address associated with a first router of a LAN and second network traffic from a second IP address associated with a second router of the LAN. The one or more interfaces also may be configured to transmit first encapsulated packets via a first tunnel instance of a tunnel and second encapsulated packets via a second tunnel instance of the tunnel over a WWAN to a second node, where an IP address of the first node is a source IP address of the first encapsulated packets and the second encapsulated packets.

Clause 29. The apparatus of any one or more of clauses 10-15 and 28, where the second node includes a tunnel server.

Clause 30. The apparatus of any one or more of clauses 10-15 and 28-29, where the one or more processors may be configured to encapsulate the first network traffic to generate the first encapsulated packets, where encapsulation the first network traffic includes encapsulation of the first network traffic inside first internet protocol IP packets each including the first identifier for the first router. The one or more processors also may be configured to encapsulate the second network traffic to generate the second encapsulated packets, where encapsulation the second network traffic includes encapsulation of the second network traffic inside second IP packets each including the second identifier for the second router.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on."

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, or the like.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

As described above, in some aspects implementations of the subject matter described in this specification can be implemented as software. For example, various functions of components disclosed herein, or various blocks or steps of a method, operation, process or algorithm disclosed herein can be implemented as one or more modules of one or more computer programs. Such computer programs can include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method for communicating performed by a first node, comprising:
   establishing, by the first node, a first connection to a wireless wide area network (WWAN);
   configuring, by the first node, a local area network (LAN);
   establishing, by the first node, a second connection to a first router in the LAN and a third connection to a second router in the LAN, wherein the first router serves a first sub-LAN of the LAN comprising a first plurality of LAN devices, the second router serves a second sub-LAN of the LAN comprising a second plurality of LAN devices, and the first sub-LAN and the second sub-LAN are separate from one another;
   assigning, by the first node, a first public internet protocol (IP) address to the first router in the LAN and a second public IP address to the second router in the LAN;
   establishing, by the first node, one of a first protocol data unit (PDU) session for the first router or a first network slice for the first router, wherein the established one of the first PDU session or the first network slice is associated with the first public IP address;
   establishing, by the first node, one of a second PDU session for the second router or a second network slice for the second router, wherein the established one of the second PDU session or the second network slice is associated with the second public IP address; and
   exchanging, for the first plurality of LAN devices in the LAN, first network traffic associated with the first public IP address over the WWAN via the established one of the first PDU session or the first network slice and, for the second plurality of LAN devices in the LAN, second network traffic associated with the second public IP address over the WWAN via the established one of the second PDU session or the second network slice.

2. The method of claim 1, wherein the first node is a modem of a user equipment (UE) of the WWAN.

3. The method of claim 1, further comprising:
   configuring a first pseudo data name network (DNN) for the first router and a second pseudo DNN for the second router.

4. The method of claim 1, wherein the WWAN is a 5G New Radio (NR) network and the LAN is a wireless LAN (WLAN).

5. The method of claim 1 further comprising:
   establishing, by the first node, the first protocol data unit (PDU) session with the WWAN for the first router and the first public IP address and the second PDU session with the WWAN for the second router and the second public IP address, the first network traffic being exchanged for the first plurality of LAN devices in the LAN over the WWAN via the first PDU session and the second network traffic being exchanged for the second plurality of LAN devices in the LAN over the WWAN via the second PDU session.

6. The method of claim 5, further comprising:
   configuring a first pseudo data name network (DNN) for the first router and a second pseudo DNN for the second router, wherein the first PDU session for the first public IP address is associated with the first pseudo DNN and the second PDU session for the second public IP address is associated with the second pseudo DNN.

7. The method of claim 1, further comprising:
   establishing, by the first node, the first network slice of the WWAN for the first public IP address and the second network slice of the WWAN for the second public IP address, the first network traffic being exchanged over the WWAN via the first network slice and the second network traffic being exchanged over the WWAN via the second network slice.

8. The method of claim 1, wherein the first public IP address is a first IPV6 address and the second public IP address is a second IPV6 address, further comprising:
   configuring one or more bits of a first IPV6 prefix of the first IPV6 address;
   configuring one or more bits of a second IPV6 prefix of the second IPv6 address;
   generating the first IPV6 address including the first IPV6 prefix; and
   generating the second IPV6 address including the second IPV6 prefix.

9. The method of claim 1, wherein the first public IP address is a first IPV6 address and the second public IP address is a second IPV6 address, further comprising:
   receiving a first IPV6 prefix from a second node of the WWAN;
   configuring one or more bits of a first IPV6 interface identifier (IID) for the first IPv6 address;
   configuring one or more bits of a second IPV6 IID for the second IPV6 address;
   generating the first IPV6 address including the first IPV6 prefix and the first IID; and generating the second IPv6 address including the first IPV6 prefix and the second IPV6 IID.

10. A first node for wireless communication, comprising:
a processing system that includes one or more processors and one or more memories coupled with the one or more processors, the processing system configured to cause the first node to:
establish, by the first node, a first connection to a wireless wide area network (WWAN);
configure, by the first node, a local area network (LAN);
establish, by the first node, a second connection to a first router in the LAN and a third connection to a second router in the LAN, wherein the first router serves a first sub-LAN of the LAN comprising a first plurality of LAN devices, the second router serves a second sub-LAN of the LAN comprising a second plurality of LAN devices, and the first sub-LAN and the second sub-LAN are separate from one another;
assign, by the first node, a first public internet protocol (IP) address to the first router in the LAN and a second public IP address to the second router in the LAN;
establish, by the first node, one of a first protocol data unit (PDU) session for the first router or a first network slice for the first router, wherein the established one of the first PDU session or the first network slice is associated with the first public IP address;
establish, by the first node, one of a second PDU session for the second router or a second network slice for the second router, wherein the established one of the second PDU session or the second network slice is associated with the second public IP address; and
exchange, for the first plurality of LAN devices in the LAN, first network traffic associated with the first public IP address over the WWAN via the established one of the first PDU session or the first network slice and, for the second plurality of LAN devices in the LAN, second network traffic associated with the second public IP address over the WWAN via the established one of the second PDU session or the second network slice.

11. The first node of claim 10, wherein the first node is a modem of a user equipment (UE) of the WWAN.

12. The first node of claim 10, wherein:
the processing system is configured to configure a first pseudo data name network (DNN) for the first router and a second pseudo DNN for the second router.

13. The first node of claim 12, wherein:
the processing system is configured to:
obtain a first request to connect to the WWAN from the first router, wherein the first request includes the first pseudo DNN, and
obtain a second request to connect to the WWAN from the second router, wherein the second request includes the second pseudo DNN.

14. The first node of claim 10 wherein the WWAN is a 5G New Radio (NR) network and the LAN is a wireless LAN (WLAN).

15. The first node of claim 10, wherein:
the processing system is configured to establish, by the first node, the first protocol data unit (PDU) session with the WWAN for the first router and the first public IP address and the second PDU session with the WWAN for the second router and the second public IP address, the first network traffic being exchanged for the first plurality of LAN devices in the LAN over the WWAN via the first PDU session and the second network traffic being exchanged for the second plurality of LAN devices in the LAN over the WWAN via the second PDU session.

16. The first node of claim 15, wherein:
the processing system is configured to configure a first pseudo data name network (DNN) for the first router and a second pseudo DNN for the second router, wherein the first PDU session for the first public IP address is associated with the first pseudo DNN and the second PDU session for the second public IP address is associated with the second pseudo DNN.

17. The first node of claim 10, wherein the first network traffic is associated with a first PDU session identifier (ID) and the second network traffic is associated with a second PDU session ID, wherein:
the processing system is configured to determine a first amount of the first network traffic based on the first PDU session ID and a second amount of the second network traffic based on the second PDU session ID.

18. The first node of claim 10, wherein:
the processing system is configured to establish, by the first node, the first network slice of the WWAN for the first public IP address and the second network slice of the WWAN for the second public IP address, the first network traffic being exchanged over the WWAN via the first network slice and the second network traffic being exchanged over the WWAN via the second network slice.

19. The first node of claim 10, wherein the first public IP address is a first IPV6 address and the second public IP address is a second IPV6 address, wherein the processing system is configured to:
configure one or more bits of a first IPV6 prefix of the first IPV6 address;
configure one or more bits of a second IPV6 prefix of the second IPV6 address;
generate the first IPv6 address including the first IPV6 prefix; and
generate the second IPV6 address including the second IPV6 prefix.

20. The first node of claim 10, wherein the first public IP address is a first IPV6 address and the second public IP address is a second IPV6 address, wherein the processing system is configured to:
obtain a first partial prefix associated with the first public IP address and a second partial prefix associated with the second public IP address from a second node on the WWAN; and
configure one or more bits of the first partial prefix and one or more bits of the second partial prefix.

21. The first node of claim 10, wherein the first public IP address is a first IPV6 address and the second public IP address is a second IPv6 address, wherein the processing system is configured to:
obtain a first IPV6 prefix from a second node of the WWAN;
configure one or more bits of a second IPV6 IID for the second IPV6 address;
generate the first IPV6 address including the first IPv6 prefix and the first IID; and
generate the second IPv6 address including the first IPV6 prefix and the second IPV6 IID.

22. A first node for wireless communication, comprising:
means for establishing, by the first node, a first connection to a wireless wide area network (WWAN);
means for configuring, by the first node, a local area network (LAN);

means for establishing, by the first node, a second connection to a first router in the LAN and a third connection to a second router in the LAN, wherein the first router serves a first sub-LAN of the LAN comprising a first plurality of LAN devices, the second router serves a second sub-LAN of the LAN comprising a second plurality of LAN devices, and the first sub-LAN and the second sub-LAN are separate from one another;

means for assigning, by the first node, a first public internet protocol (IP) address to the first router in the LAN and a second public IP address to the second router in the LAN;

means for establishing, by the first node, one of a first protocol data unit (PDU) session for the first router or a first network slice for the first router, wherein the established one of the first PDU session or the first network slice is associated with the first public IP address;

means for establishing, by the first node, one of a second PDU session for the second router or a second network slice for the second router, wherein the established one of the second PDU session or the second network slice is associated with the second public IP address; and means for exchanging, for the first plurality of LAN devices in the LAN, first network traffic associated with the first public IP address over the WWAN via the established one of the first PDU session or the first network slice and, for the second plurality of LAN devices in the LAN, second network traffic associated with the second public IP address over the WWAN via the established one of the second PDU session or the second network slice.

23. The first node of claim 22, further comprising:
means for establishing, by the first node, the first network slice of the WWAN for the first public IP address and the second network slice of the WWAN for the second public IP address, the first network traffic being exchanged over the WWAN via the first network slice and the second network traffic being exchanged over the WWAN via the second network slice.

24. The first node of claim 22, wherein the first public IP address is a first IPv6 address and the second public IP address is a second IPV6 address, the first node further comprising:
means for configuring one or more bits of a first IPV6 prefix of the first IPV6 address;
means for configuring one or more bits of a second IPV6 prefix of the second IPV6 address;
means for generating the first IPV6 address including the first IPV6 prefix; and
means for generating the second IPV6 address including the second IPv6 prefix.

25. The first node of claim 22, wherein the first public IP address is a first IPV6 address and the second public IP address is a second IPV6 address, the first node further comprising:
means for receiving a first IPV6 prefix from a second node of the WWAN;
means for configuring one or more bits of a first IPv6 interface identifier (IID) for the first IPv6 address;
means for configuring one or more bits of a second IPV6 IID for the second IPV6 address;
means for generating the first IPV6 address including the first IPV6 prefix and the first IID; and means for generating the second IPV6 address including the first IPV6 prefix and the second IPV6 IID.

26. The first node of claim 22, further comprising:
means for establishing, by the first node, the first protocol data unit (PDU) session with the WWAN for the first router and the first public IP address and the second PDU session with the WWAN for the second router and the second public IP address, the first network traffic being exchanged for the first plurality of LAN devices in the LAN over the WWAN via the first PDU session and the second network traffic being exchanged for the second plurality of LAN devices in the LAN over the WWAN via the second PDU session.

27. The first node of claim 26, further comprising:
means for configuring a first pseudo data name network (DNN) for the first router and a second pseudo DNN for the second router, wherein the first PDU session for the first public IP address is associated with the first pseudo DNN and the second PDU session for the second public IP address is associated with the second pseudo DNN.

28. A non-transitory computer-readable medium storing code for wireless communication performed by a first node, the code comprising instructions executable by one or more processors to:
establish, by the first node, a first connection to a wireless wide area network (WWAN);
configure, by the first node, a local area network (LAN);
establish, by the first node, a second connection to a first router in the LAN and a third connection to a second router in the LAN, wherein the first router serves a first sub-LAN of the LAN comprising a first plurality of LAN devices, the second router serves a second sub-LAN of the LAN comprising a second plurality of LAN devices, and the first sub-LAN and the second sub-LAN are separate from one another;
assign, by the first node, a first public internet protocol (IP) address to the first router in the LAN and a second public IP address to the second router in the LAN;
establish, by the first node, one of a first protocol data unit (PDU) session for the first router or a first network slice for the first router, wherein the established one of the first PDU session or the first network slice is associated with the first public IP address;
establish, by the first node, one of a second PDU session for the second router or a second network slice for the second router, wherein the established one of the second PDU session or the second network slice is associated with the second public IP address; and
exchange, for the first plurality of LAN devices in the LAN, first network traffic associated with the first public IP address over the WWAN via the established one of the first PDU session or the first network slice and, for the second plurality of LAN devices in the LAN, second network traffic associated with the second public IP address over the WWAN via the established one of the second PDU session or the second network slice.

29. The non-transitory computer-readable medium of claim 28, wherein the first node is a modem of a user equipment (UE) of the WWAN.

30. The non-transitory computer-readable medium of claim 28, wherein the WWAN is a 5G New Radio (NR) network and the LAN is a wireless LAN (WLAN).

* * * * *